United States Patent
Kawai

(10) Patent No.: US 12,177,346 B2
(45) Date of Patent: Dec. 24, 2024

(54) RE-ENCRYPTION DEVICE, CRYPTOGRAPHIC SYSTEM, RE-ENCRYPTION METHOD, AND COMPUTER READABLE MEDIUM

(71) Applicant: Mitsubishi Electric Corporation, Tokyo (JP)

(72) Inventor: Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 159 days.

(21) Appl. No.: 17/969,403

(22) Filed: Oct. 19, 2022

(65) Prior Publication Data

US 2023/0087142 A1     Mar. 23, 2023

Related U.S. Application Data

(63) Continuation of application No. PCT/JP2020/023680, filed on Jun. 17, 2020.

(51) Int. Cl.
  *H04L 9/08* (2006.01)
  *H04L 9/06* (2006.01)

(52) U.S. Cl.
  CPC .......... *H04L 9/0891* (2013.01); *H04L 9/0618* (2013.01); *H04L 9/0869* (2013.01)

(58) Field of Classification Search
  CPC .... H04L 9/0891; H04L 9/0618; H04L 9/0869
  See application file for complete search history.

(56) References Cited

U.S. PATENT DOCUMENTS 11,824,638 B2 * 11/2023 Kawai .................. H04L 9/3073
2002/0085710 A1 * 7/2002 Ananth .................. H04L 9/065
                                                               380/37

(Continued)

FOREIGN PATENT DOCUMENTS

JP         2009-302861 A     12/2009
JP         2010-141618 A      6/2010

(Continued)

OTHER PUBLICATIONS

Yutaka Kawai and Katsuyuki Takashima, "Fully-Anonymous Functional Proxy-Re-Encryption", Mitsubishi Electric, Published Oct. 13, 2013. (Year: 2013).*

(Continued)

*Primary Examiner* — Chau Le
(74) *Attorney, Agent, or Firm* — Birch, Stewart, Kolasch & Birch, LLP

(57) ABSTRACT

An encryption device (30) generates a session key K and a ciphertext $ct_S$ in which the session key K is encrypted that are generated by an encryption algorithm using as input attribute information S. A re-encryption key generation device (40) generates a re-encryption key rk including a converted decryption key $sk_\Gamma^\sim$ generated by setting a random number r in a decryption key $sk_\Gamma$ with which the ciphertext $ct_S$ can be decrypted, a session key K' and a ciphertext $ct_{S'}$ that are generated by the encryption algorithm using as input attribute information S', and conversion information generated from the random number r. A re-encryption device (50) outputs a re-encrypted ciphertext $rct_{S'}$ including the ciphertext $ct_{S'}$ and a cipher element $K^\sim$ generated by deleting an element related to the random number r by the conversion information from decryption information $K^\wedge$ obtained by decrypting the ciphertext $ct_S$ with the converted decryption key $sk_\Gamma^\sim$ and setting the session key K'.

14 Claims, 18 Drawing Sheets

(56) References Cited

U.S. PATENT DOCUMENTS

| | | | |
|---|---|---|---|
| 2016/0234012 A1* | 8/2016 | Kawai | ............... H04L 9/0861 |
| 2016/0344708 A1 | 11/2016 | Kawai et al. | |
| 2021/0126782 A1 | 4/2021 | Koseki et al. | |

FOREIGN PATENT DOCUMENTS

| | | |
|---|---|---|
| JP | 2010-161523 A | 7/2010 |
| JP | 2012-150378 A | 8/2012 |
| WO | WO 2015/107620 A1 | 7/2015 |
| WO | WO 2018/225248 A1 | 12/2018 |
| WO | WO-2019093201 A1 * | 5/2019 ............. H04L 12/66 |

OTHER PUBLICATIONS

Kawai et al., "Proxy Re-Encryption That Supports Homomorphic Operations for Re-Encrypted Ciphertexts", IEICE Trans. Fundamentals, vol. E102-A, No. 1 Jan. 2019 (Year: 2019).*

Ran Canetti and Susan Hohenberger, "Chosen-Ciphertext Secure Proxy Re-Encryption", Retrieved From https://eprint.iacr.org/2007/171.pdf, Published Oct. 23, 2007 (Year: 2007).*

International Search Report for PCT/JP2020/023680 (PCT/ISA/210) mailed on Sep. 15, 2020.

Lai et al., "Adaptable Ciphertext-Policy Attribute-Based Encryption", Pairing-Based Cryptography—Pairing 2013: 6th International Conference, Beijing, China, Nov. 22-24: Revised Selected Papers, Research Collection School Of Information Systems., 2013, vol. 8365, pp. 199-214, https://ink.library.smu.edu.sg/sis_research/1950/.

Luo et al., "Ciphertext Policy Attribute-Based Proxy Re-encryption", ICICS 2010, LNCS, 2010, vol. 6476, pp. 401-415.

Written Opinion of the International Searching Authority for PCT/JP2020/023680 (PCT/ISA/237) mailed on Sep. 15, 2020.

* cited by examiner

Fig. 3

$$s_0 = \left( \underbrace{[1,\ldots,1]}_{r \text{ COLUMNS}} \left( f_1, \ldots, f_r \right) \right) = \sum_{k=1}^{r} f_k$$

Fig. 4

$$\vec{s}^T = \begin{pmatrix} M_{1,1} & M_{1,2} & \cdots & M_{1,r} \\ M_{2,1} & M_{2,2} & \cdots & M_{2,r} \\ \vdots & \vdots & \ddots & \vdots \\ M_{L,1} & M_{L,2} & \cdots & M_{L,r} \end{pmatrix}$$

$$= \begin{pmatrix} f_1, & \cdots & , f_r \end{pmatrix}$$

$$= \begin{pmatrix} s_1, & \cdots & , s_L \end{pmatrix}$$

RE-ENCRYPTION DEVICE, CRYPTOGRAPHIC SYSTEM, RE-ENCRYPTION METHOD, AND COMPUTER READABLE MEDIUM

CROSS REFERENCE TO RELATED APPLICATIONS

This application is a Continuation of PCT International Application No. PCT/JP2020/023680, filed on Jun. 17, 2020, all of which is hereby expressly incorporated by reference into the present application.

TECHNICAL FIELD

The present disclosure relates to a proxy re-encryption (PRE) technique in functional encryption or attribute-based encryption in which an access range can be set.

BACKGROUND ART

PRE is a system in which a decryption authority for a ciphertext is transferred to another person without decrypting the ciphertext.

Non-Patent Literature 1 describes a scheme of PRE in attribute-based encryption (attribute-based PRE, ABPRE). Non-Patent Literature 2 describes a scheme of attribute-based encryption in which a specific user can make any attribute change (adaptable attribute-based encryption, Ad-PRE). Patent Literature 1 describes a PRE scheme in which an increase in the data size of a ciphertext when being re-encrypted is reduced in comparison with Non-Patent Literature 1 and Non-Patent Literature 2.

CITATION LIST

Patent Literature

Patent Literature 1: WO 2015-107620 A1

Non-Patent Literature

Non-Patent Literature 1: Song Luo, Jianbin Hu, and Zhong Chen "Ciphertext Policy Attribute-Based Proxy Re-encryption"

Non-Patent Literature 2: Junzuo Lai and Robert H. Deng and Yanjiang Yang and Jian Weng. "Adaptable Ciphertext-Policy Attribute-Based Encryption"

SUMMARY OF INVENTION

Technical Problem

In the PRE scheme described in Non-Patent Literature 1, a problem is that the data size of a ciphertext increases each time re-encryption is performed. Specifically, when re-encryption is performed N times, the data size of a ciphertext increases by a size in proportion to N. Therefore, there is a convenience-related problem that if re-encryption is performed repeatedly, the data size of a ciphertext may exceed a size that is determined by the system.

When data is decrypted once and then re-encrypted, data that has been increased can be deleted. However, decrypting the data once causes the data to return to a plaintext once, so that there is a problem in terms of security.

In the PRE scheme described in Non-Patent Literature 2, an entity with a specific high-level authority can freely change an access range for any ciphertext. However, since the access range for any ciphertext can be changed in any way, there is a problem in terms of security.

In the PRE scheme described in Patent Literature 1, an increase in the data size of a ciphertext when being re-encrypted can be suppressed. However, the data size of a ciphertext increases in proportion to the number of times re-encryption is performed, as in Non-Patent Literature 1 and Non-Patent Literature 2.

An object of the present disclosure is to make it possible to make the data size of a ciphertext generated by re-encryption not dependent on the number of times re-encryption is performed.

Solution to Problem

A re-encryption device according to the present disclosure includes a ciphertext acquisition unit to acquire a ciphertext $ct_S$ out of a session K and the ciphertext $ct_S$, the session key K being generated by an encryption algorithm using as input attribute information S that defines a range to be permitted decryption, the ciphertext $ct_S$ being a ciphertext in which the session key K is encrypted;

a key acquisition unit to acquire a re-encryption key rk including a converted decryption key $sk_\Gamma^\sim$ that is generated by setting a random number r in a decryption key $sk_\Gamma$ with which the ciphertext $ct_S$ can be decrypted, a session key K' and a ciphertext $ct_{S'}$ in which the session key K' is encrypted that are generated by the encryption algorithm using as input attribute information S' that defines a range to be permitted decryption, and conversion information that is generated from the random number r;

a re-encrypted ciphertext generation unit to generate a cipher element $K^\sim$ by deleting an element related to the random number r by the conversion information from decryption information $K^\wedge$ and setting the session key K', the decryption information $K^\wedge$ being obtained by decrypting the ciphertext $ct_S$ with the converted decryption key $sk_\Gamma^\sim$ included in the re-encryption key rk; and an output unit to output a re-encrypted ciphertext $rct_{S'}$ including the cipher element $K^\sim$ and the ciphertext $ct_{S'}$.

Advantageous Effects of Invention

In the present disclosure, a re-encrypted ciphertext $rct_{S'}$ includes a cipher element $K^\sim$ that is generated from a session key K and a session key K' and includes a ciphertext $ct_{S'}$. The session key K' is generated by decrypting the ciphertext $ct_{S'}$ with a decryption key $sk_{\Gamma'}$, and the session key K can be generated from the cipher element $K^\sim$ and the session key K'.

Also when a ciphertext $ct_{S'}$ is handled as a ciphertext $ct_S$ to generate a re-encrypted ciphertext $rct_{S''}$, a similar re-encrypted ciphertext $rct_{S'}$ is output and a session key K can be generated similarly.

Therefore, it is possible to make the data size of a ciphertext generated by re-encryption not dependent on the number of times re-encryption is performed.

BRIEF DESCRIPTION OF DRAWINGS

FIG. 3 is an explanatory drawing of $s_0$ according to the first embodiment;

FIG. 4 is an explanatory drawing of $s^{\rightarrow T}$ according to the first embodiment;

DESCRIPTION OF EMBODIMENTS

Figure 1:
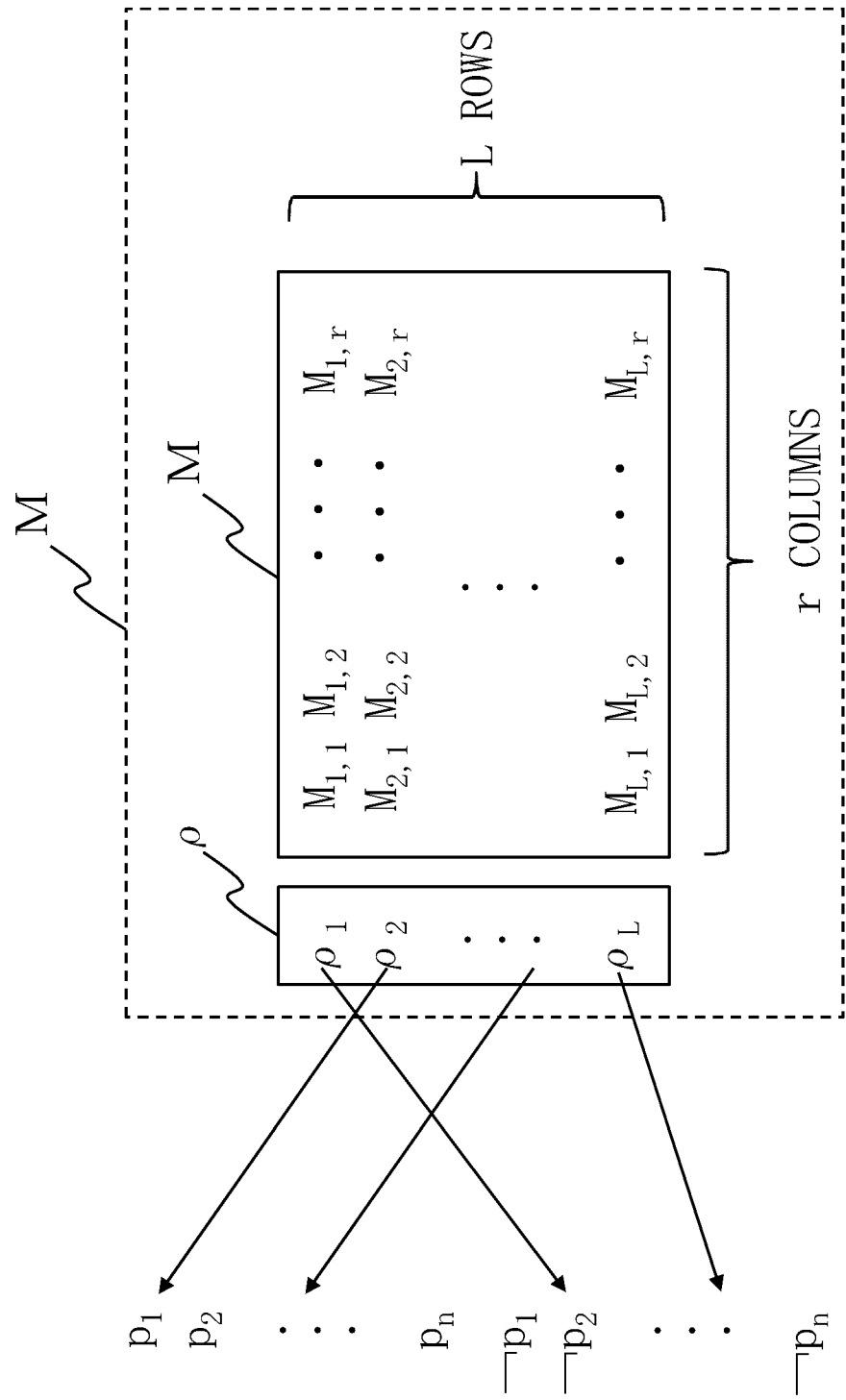
FIG. 1 is an explanatory drawing of a matrix $M^\wedge$ according to a first embodiment.

First Embodiment
*Preliminaries*
<Description of Notations>

When A is a random variable or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that y is a set defined by z or y is a set substituted by z.

$$y := z \quad \text{[Formula 103]}$$

When a is a constant, Formula 104 denotes that a machine (algorithm) A outputs a on input x.

$$A(x) \rightarrow a \quad \text{[Formula 104]}$$

for example, $$A(x) \rightarrow 1$$

Formula 105, namely $\mathbb{F}_q$, denotes a finite field of order q.

$$\mathbb{F} \quad \text{[Formula 105]}$$

Formula 106 is represented as Formula 107.

$$\mathbb{F}_q \setminus \{0\} \quad \text{[Formula 106]}$$

$$\mathbb{F}_q^{\times} \quad \text{[Formula 107]}$$

A vector representation denotes a vector over the finite field $\mathbb{F}_q$. That is, this is as indicated in Formula 108.

$\vec{x}$ denotes $$(x_1, \ldots, x_n) \in \mathbb{F}_q^n. \quad \text{[Formula 108]}$$

Note that $X^T$ denotes the transpose of a matrix X.

An element in a vector space of Formula 109 is represented as Formula 110.

$$\mathbb{V} \quad \text{[Formula 109]}$$

$$x \in \mathbb{V} \quad \text{[Formula 110]}$$

In the case of Formula 111, a subspace formed by $b_i, \ldots, b_n$ is represented as Formula 112.

$$b_i \in \mathbb{V} \ (i=1, \ldots, n) \quad \text{[Formula 111]}$$

$$\text{span}\langle b_1, \ldots, b_n \rangle \subseteq \mathbb{V} \quad \text{[Formula 112]}$$

Formula 113 denotes the inner-product, indicated in Formula 115, of two vectors $\vec{x}$ and $\vec{v}$ indicated in Formula 114.

$$\vec{x} \cdot \vec{v} \quad \text{[Formula 113]}$$

$$\vec{x} = (x_1, \ldots, x_n),$$

$$\vec{v} = (v_1, \ldots, v_n) \quad \text{[Formula 114]}$$

$$\Sigma_{i=1}^n x_i v_i \quad \text{[Formula 115]}$$

For a basis B and a basis B* indicated in Formula 116, Formula 117 is established.

$$\mathbb{B} := (b_1, \ldots, b_N),$$

$$\mathbb{B}^* := (b_1^*, \ldots, b_N^*) \quad \text{[Formula 116]}$$

$$(x_1, \ldots, x_N)_\mathbb{B} := \Sigma_{i=1}^N x_i b_i,$$

$$(y_1, \ldots, y_N)_{\mathbb{B}^*} := \Sigma_{i=1}^N y_i b_i^* \quad \text{[Formula 117]}$$

Note that $\vec{e}_j$ denotes a normal basis vector indicated in Formula 118.

$$\vec{e}_j := (\overbrace{0 \ldots 0}^{j-1}, 1, \overbrace{0 \ldots 0}^{n-j}) \in \mathbb{F}_q^n \ \text{for} \ j = 1, \ldots, n, \quad \text{[Formula 118]}$$

$GL(n, \mathbb{F}_q)$ represents a general linear group of dimension n over the finite field $\mathbb{F}_q$.

For a matrix W indicated in Formula 119 and an element g in an n-dimensional vector space V indicated in Formula 120, Formula 121 is defined.

$$W := (w_{i,j})_{i,j=1, \ldots, n} \in \mathbb{F}_q^{n \times n} \quad \text{[Formula 119]}$$

$$g := (G_1, \ldots, G_n) \quad \text{[Formula 120]}$$

$$gW := (\Sigma_{i=1}^n G_i w_{i,1}, \ldots, \Sigma_{i=1}^n G_i w_{i,n}) =$$
$$(\Sigma_{i=1}^n w_{i,1} G_i, \ldots, \Sigma_{i=1}^n w_{i,n} G_i) \quad \text{[Formula 121]}$$

<Symmetric Bilinear Pairing Groups>

Symmetric bilinear pairing groups (q, G, $G_T$, g, e) are a tuple of a prime q, a cyclic additive group G of order q, a cyclic multiplicative group $G_T$ of order q, $g \neq 0 \in G$, and a polynomial-time computable nondegenerate bilinear map e: $G \times G \rightarrow G_T$. The bilinear map signifies $e(sg, tg) = e(g, g)^{st}$, and $e(g, g) \neq 1$.

In the following description, let $G_{bpg}$ be an algorithm that takes as input $1^\lambda$ and outputs values of a parameter $param_G := (q, G, G_T, g, e)$ of bilinear pairing groups with a security parameter $1^\lambda$.

<Dual Pairing Vector Spaces>

Dual pairing vector spaces (q, V, $G_T$, A, e) can be constructed by a direct product of the symmetric bilinear pairing groups ($param_G := (q, G, G_T, g, e)$). The dual pairing vector spaces (q, V, $G_T$, A, e) are a tuple of a prime q, an N-dimensional vector space V over $F_q$ indicated in Formula 122, a cyclic group $G_T$ of order q, a canonical basis $A := (a_1, \ldots, a_N)$ of the space V, and a paring operation e indicated in Formula 123. Note that $a_i$ is as indicated in Formula 124.

$$\mathbb{V} := \overbrace{G \times \ldots \times G}^{N}$$ [Formula 122]

$$e: \mathbb{V} \times \mathbb{V} \rightarrow G_T$$ [Formula 123]

$$a_i := (\overbrace{0, \ldots, 0}^{i-1}, g, \overbrace{0, \ldots, 0}^{N-i})$$ [Formula 124]

A pairing in the space V is defined by Formula 125.

This is nondegenerate. That is, $e(sx, ty) = e(x, y)^{st}$ and if $e(x, y) = 1$ for all $y \in V$, then $x = 0$. For all i and j, $e(a_i, a_j) = e(g, g)^{\delta_{i,j}}$, where $\delta_{i,j} = 1$ if $i = j$, and $\delta_{i,j} = 0$ if $i \neq J$, and $e(g, g) \neq 1 \in G_T$.

$$e(x, y) := \Pi_{i=1}^N e(G_i, H_i) \in \mathbb{G}_T$$ [Formula 125]

where $(G_1, \ldots, G_N) := x \in \mathbb{V}$, $(H_1, \ldots, H_N) := y \in \mathbb{V}$.

In the following description, let $G_{dpvs}$ be an algorithm that takes as input $1^\lambda$ ($\lambda \in$ natural numbers), $N \in$ natural numbers, and the values of the parameter $param_G := (q, G, G_T, g, e)$ of bilinear pairing groups, and outputs values of a parameter $param_V := (q, V, G_T, A, e)$ of dual pairing vector spaces of the N-dimensional vector space V with a security parameter $\lambda$.

<Attribute-Based Encryption for Non-Monotone Access Structure>

Attribute-based encryption is an encryption scheme in which the functions of pubic key encryption or identifier (ID)-based encryption are extended. ABE is public key encryption in which an attribute set $\Gamma$ is set in one of a ciphertext and a decryption key and an access structure S for the entirety of attributes is set in the other of the ciphertext and the decryption key, and decryption is possible if and only if the attribute set $\Gamma$ satisfies the access structure S.

ABE in which an access structure is set in a ciphertext is called ciphertext policy attribute-based encryption (CP-ABE), and ABE in which an access structure is set in a decryption key is called key policy attribute-based encryption (KP-ABE). In a first embodiment, CP-ABE will be described. However, it is easy to convert CP-ABE into KP-ABE. In ABE, a conditional expression using logical sum (OR) and logical conjunction (AND) can be set as an access structure. This allows an access right such as "division A and at least section manager" to be set, so that CP-ABE is considered useful for secure file sharing in a company and so on.

<Span Program and Non-Monotone Access Structure>

Referring to FIG. 1, a matrix $M^\wedge$ will be described.

Let $\{p_1, \ldots, p_n\}$ be a set of variables. $M^\wedge := (M, \rho)$ is a labeled matrix. The matrix M is an (L rows×r columns) matrix over $F_q$, and $\rho$ is a label of columns of the matrix M and is related to one of literals $\{p_1, \ldots, p_n, \neg p_1, \ldots, \neg p_n\}$. A label $\rho_i$ (i=1, ..., L) of each row of M is related to one of the literals. That is, $\rho: \{1, \ldots, L\} \rightarrow \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M the labels $\rho$ of which are related to a value "1" by the input sequence $\delta$. That is, the matrix $M_\delta$ is a submatrix consisting of the rows of the matrix M which are related to $p_i$ such that $\delta_i = 1$ and the rows of the matrix M which are related to $\neg p_i$ such that $\delta_i = 0$.

Figure 2:
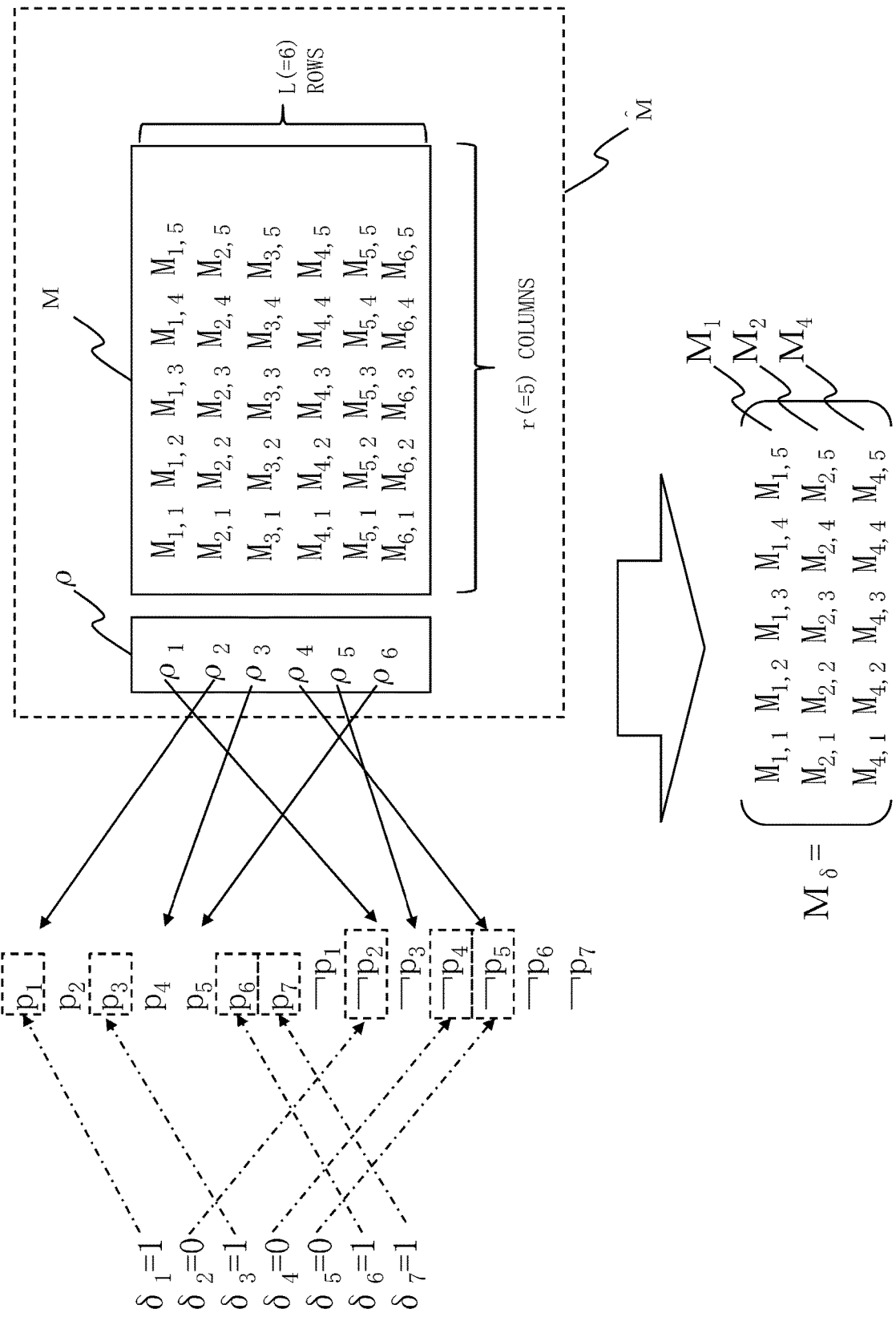
FIG. 2 is an explanatory drawing of a matrix $M_\delta$ according to the first embodiment.

Referring to FIG. 2, the matrix $M_\delta$ will be described. Note that n=7, L=6, and r=5 in FIG. 2. That is, the set of variables is $\{p_1, \ldots, p_7\}$, and the matrix M is a (6 rows×5 columns) matrix. In FIG. 2, it is assumed that the labels p are related such that $\rho_1$ is related to $\neg p_2$, $\rho_2$ to $p_1$, $\rho_3$ to $p_4$, $\rho_4$ to $\neg p_5$, $\rho_5$ to $\neg p_3$, and $\rho_6$ to $p_5$.

It is assumed that in an input sequence $\delta \in \{0, 1\}^7$, $\delta_1 = 1$, $\delta_2 = 0$, $\delta_3 = 1$, $\delta_4 = 0$, $\delta_5 = 0$, $\delta_6 = 1$, and $\delta_7 = 1$. In this case, a submatrix consisting of the rows of the matrix M which are related to literals ($p_1$, $p_3$, $p_6$, $p_7$, $\neg p_2$, $\neg p_4$, $\neg p_5$) surrounded by broken lines is the matrix $M_\delta$. That is, the submatrix consisting of the first row ($M_1$), second row ($M_2$), and fourth row ($M_4$) of the matrix M is the matrix $M_\delta$.

In other words, if map $\gamma: \{1, \ldots, L\} \rightarrow \{0, 1\}$ is $[\rho(j) = p_i] \wedge [\delta_i = 1]$ or $[\rho(j) = \neg p_i] \wedge [\delta_i = 0]$, then $\gamma(j) = 1$; otherwise $\gamma(j) = 0$. In this case, $M_\delta := (M_j)_{\gamma(j) = 1}$. Note that $M_j$ is the i-th row of the matrix M.

That is, in FIG. 2, map $\gamma(j) = 1$ (j=1, 2, 4), and map $\gamma(j) = 0$ (j=3, 5, 6). Hence, $(M_j)_{\gamma(j) = 1}$ is $M_1$, $M_2$, and $M_4$, and is the matrix $M_\delta$.

More specifically, whether or not the j-th row of the matrix M is included in the matrix $M_\delta$ is determined by whether the value of the map $\gamma(j)$ is "0" or "1".

A span program $M^\wedge$ accepts an input sequence $\delta$ if and only if $1^\rightarrow \in span<M_\delta>$, and rejects the input sequence $\delta$ otherwise. That is, the span program $M^\wedge$ accepts the input sequence $\delta$ if and only if a linear combination of the rows of the matrix $M_\delta$ that are obtained from the matrix $M^\wedge$ by the input sequence $\delta$ gives $1^\rightarrow$. Note that $1^\rightarrow$ is a row vector that has a value "1" in each element.

For example, in an example of FIG. 2, the span program $M^\wedge$ accepts the input sequence $\delta$ if and only if a linear combination of the respective rows of the matrix $M_\delta$ consisting of the first, second, and fourth rows of the matrix M gives $1^\rightarrow$. That is, if there exist $\alpha_1$, $\alpha_2$, and $\alpha_4$ with which $\alpha_1(M_1) + \alpha_2(M_2) + \alpha_4(M_4) = 1^\rightarrow$, the span program $M^\wedge$ accepts the input sequence $\delta$.

The span program is called monotone if its labels p are related to only positive literals $\{p_1, \ldots, p_n\}$. The span program is called non-monotone if its labels $\rho$ are related to the literals $\{p_1, \ldots, p_n, \neg p_1, \ldots, \neg p_n\}$. It is assumed here that the span program is non-monotone. An access structure (non-monotone access structure) is constructed using the non-monotone span program. Briefly, an access structure controls access to encryption. That is, it controls whether a ciphertext can be decrypted or not.

<Inner-Product of Attribute Information and Access Structure>

The above-described map $\gamma(j)$ is calculated using an inner-product of attribute information. That is, the inner-product of attribute information is used to determine which rows of the matrix M are to be included in the matrix $M_\delta$.

$U_t$ (t=1, ..., d and $U_t \subset \{0, 1\}*$) is a sub-universe and a set of attributes. Each $U_t$ includes identification information (t) of the sub-universe and an n-dimensional vector ($v^\rightarrow$). That is, $U_t$ is (t, $v^\rightarrow$), where t∈{1, ..., d} and $v^\rightarrow \in F_q^n$.

Let $U_t:=(t, v^\rightarrow)$ be a variable p in a span program $M^:=(M, \rho)$. That is, p:=(t, $v^\rightarrow$). Let the span program $M^:=(M, \rho)$ with the variable (p:=(t, $v^\rightarrow$), (t, $v'^\rightarrow$), ...) be an access structure S.

That is, the access structure S:=(M, ρ) and ρ:{1, ..., L}→{(t, $v^\rightarrow$), (t, $v'^\rightarrow$), ..., ¬(t, $v^\rightarrow$), ¬(t, $v'^\rightarrow$), ...}.

Next, let Γ be an attribute set. That is, Γ:={(t, $x^\rightarrow_t$)|$x^\rightarrow_t \in F_q^n$, 1≤t≤d}.

When Γ is given to the access structure S, a map γ: {1, ..., L}→{0, 1} for the span program $M^:=(M, \rho)$ is defined as described below. If [ρ(i)=(t, $v^\rightarrow_i$)]∧[(t, $x^\rightarrow_t$)∈Γ]∧[$v^\rightarrow_i \cdot x^\rightarrow_t$=0] or [ρ(i)=¬(t, $v^\rightarrow_i$)]∧[(t, $x^\rightarrow_t$)∈Γ]∧[$v^\rightarrow_i \cdot x^\rightarrow_t \neq 0$] for each integer i of i=1, ..., L, then γ(j)=1, and otherwise γ(j)=0.

That is, the map γ is calculated based on the inner-product of the attribute information $v^\rightarrow$ and $x^\rightarrow$. Then, which rows of the matrix M are to be included in the matrix $M_\delta$ is determined by the map γ, as described above. That is, which rows of the matrix M are to be included in the matrix $M_\delta$ is determined by the inner-product of the attribute information $v^\rightarrow$ and $x^\rightarrow$, and if and only if $1^\rightarrow \in$ span<$(M_i)_{\gamma(i)=1}$>, the access structure S:=(M, ρ) accepts Γ.

<Secret Distribution Scheme>

Secret distribution in a non-monotone access structure (or span program) will be defined.

The secret distribution scheme is distributing secret information to render it nonsense distributed information. For example, secret information s is distributed into 10 pieces to generate 10 pieces of distributed information. Each of the 10 pieces of distributed information does not have information on the secret information s. Hence, even when one of the pieces of distributed information is obtained, no information can be obtained on the secret information s. On the other hand, if all of the 10 pieces of distributed information are obtained, the secret information s can be recovered.

There is another secret distribution scheme according to which the secret information s can be recovered if some (for example, 8 pieces) of distributed information can be obtained, without obtaining all of the 10 pieces of distributed information. A case like this where the secret information s can be recovered using 8 pieces out of 10 pieces of distributed information is called 8-out-of-10. That is, a case where the secret information s can be recovered using t pieces out of n pieces of distributed information is called t-out-of-n. This t is called a threshold value.

There is still another secret distribution scheme according to which when 10 pieces of distributed information $d_1, ..., d_{10}$ are generated, the secret information s can be recovered with 8 pieces of distributed information $d_1, ..., d_8$, but the secret information s cannot be recovered with 8 pieces of distributed information $d_3, ..., d_{10}$. In other words, there is also a secret distribution scheme according to which whether or not the secret information s can be recovered is controlled not only by the number of pieces of distributed information obtained, but also the combination of distributed information obtained.

Referring to FIG. 3, so will be described. Referring to FIG. 4, $s^{\rightarrow T}$ will be described.

Let a matrix M be an (L rows×r columns) matrix. Let $f^{\rightarrow T}$ be a column vector indicated in Formula 126.

$$\vec{f}^T := (f_1, \ldots, f_r)^T \xleftarrow{U} F_q^r \qquad \text{[Formula 126]}$$

Let $s_0$ indicated in Formula 127 be secret information to be shared.

$$s_0 := \vec{1} \cdot \vec{f}^T := \Sigma_{k=1}^r f_k \qquad \text{[Formula 127]}$$

Let $s^{\rightarrow T}$ indicated in Formula 128 be a vector of L pieces of distributed information of $s_0$.

$$\vec{s}^T := (s_1, \ldots, s_L)^T := M \cdot \vec{f}^T \qquad \text{[Formula 128]}$$

It is assumed that distribution information $s_i$ belongs to ρ(i).

If the access structure S:=(M, ρ) accepts Γ, that is, if $1^\rightarrow \in$ span<$(M_i)_{\gamma(i)=1}$> for γ: {1, ..., L}→{0, 1}, then there exist constants {$\alpha_i \in F_q$|i∈I} such that I⊆{i∈{1, ..., L}|γ(i)—=1}.

This is obvious from the explanation about the example of FIG. 2 that if there exist $\alpha_1$, $\alpha_2$, and $\alpha_4$ with which $\alpha_1(M_1)+\alpha_2(M_2)+\alpha_4(M_4)=1^\rightarrow$, the span program $M^$ accepts the input sequence δ. That is, if the span program $M^$ accepts the input sequence δ when there exist $\alpha_1$, $\alpha_2$, and $\alpha_4$ with which $\alpha_1(M_1)+\alpha_2(M_2)+\alpha_4(M_4)=1^\rightarrow$, then there exist $\alpha_1$, $\alpha_2$, and $\alpha_4$ with which $\alpha_1(M_1)+\alpha_2(M_2)+\alpha_4(M_4)=1^\rightarrow$.

Note Formula 129.

$$\Sigma_{i \in I} \alpha_i s_i = s_0 \qquad \text{[Formula 129]}$$

Note that constants {$\alpha_i$} are computable in time polynomial in the size of the matrix M.

*Description of Configurations*

Figure 5:
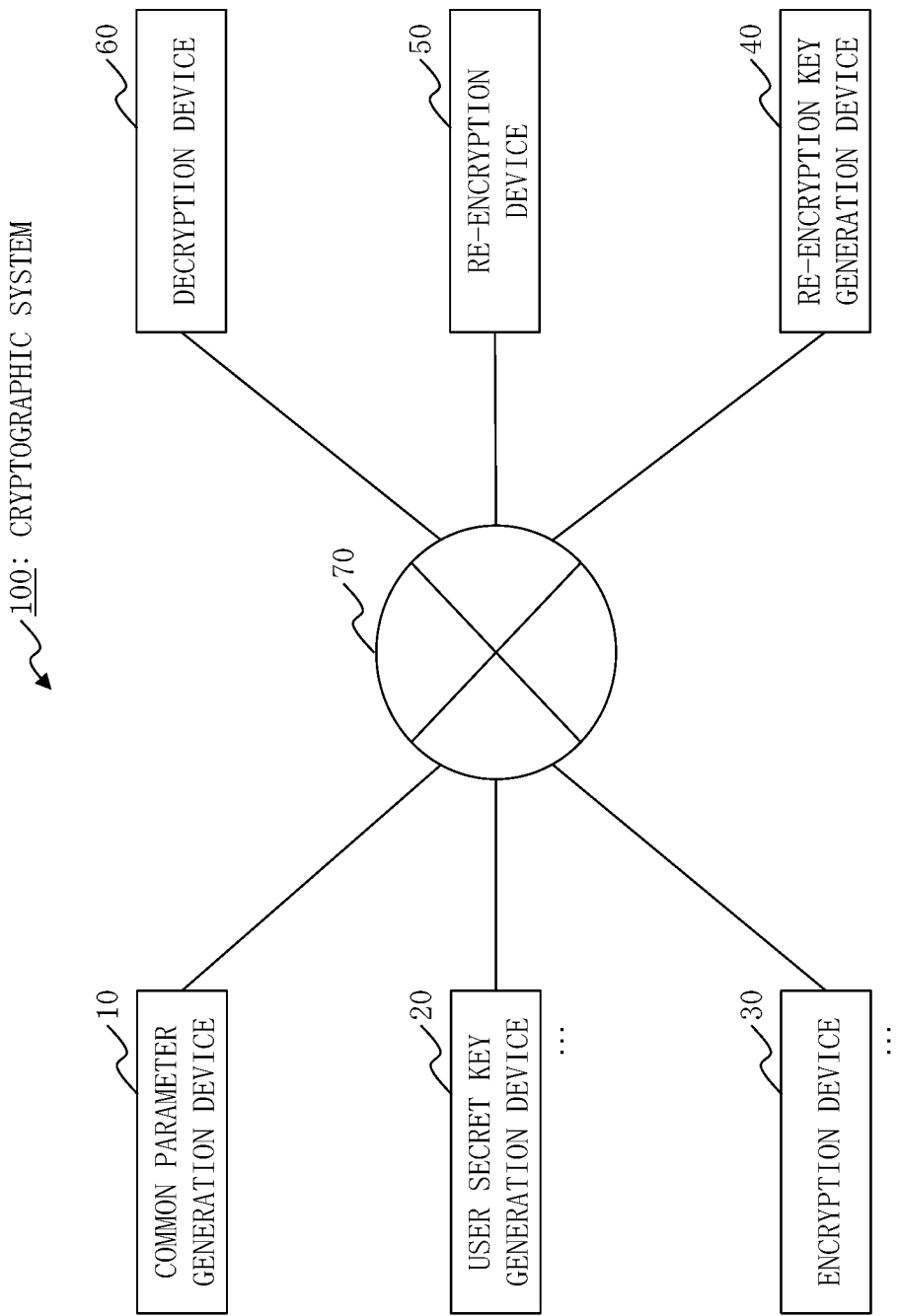
FIG. 5 is a configuration diagram of a cryptographic system 100 according to the first embodiment.

Referring to FIG. 5, a configuration of a cryptographic system 100 according to the first embodiment will be described.

The cryptographic system 100 includes a common parameter generation device 10, user secret key generation devices 20, encryption devices 30, a re-encryption key generation device 40, a re-encryption device 50, and a decryption device 60.

The common parameter generation device 10, each of the user secret key generation devices 20, the re-encryption key generation device 40, each of the encryption devices 30, the re-encryption device 50, and the decryption device 60 are connected through a transmission line 70. A specific example of the transmission line 70 is the Internet or a local area network (LAN).

Figure 6:
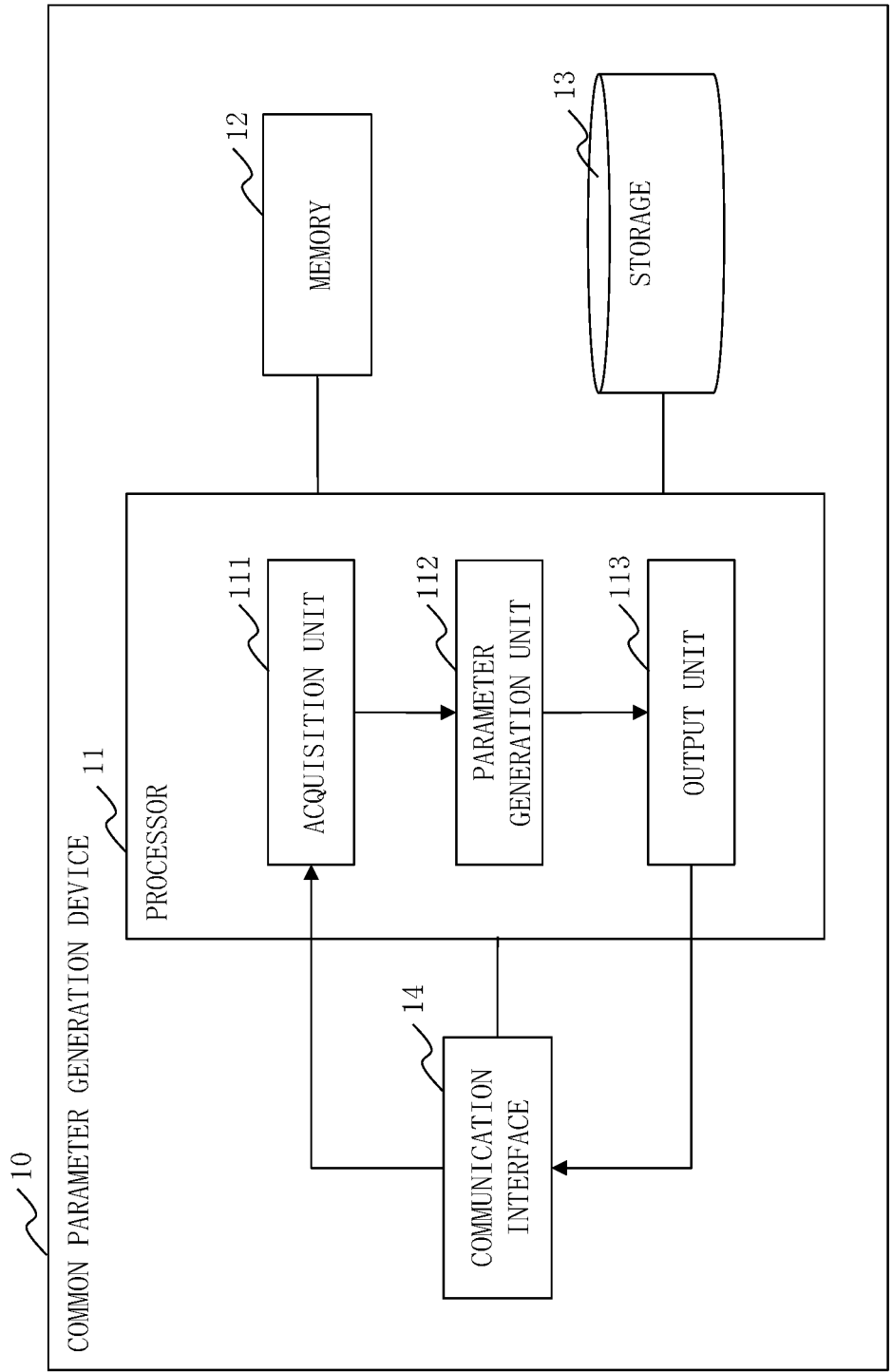
FIG. 6 is a configuration diagram of a common parameter generation device 10 according to the first embodiment.

Referring to FIG. 6, a configuration of the common parameter generation device 10 according to the first embodiment will be described.

The common parameter generation device 10 is a computer.

The common parameter generation device 10 includes hardware of a processor 11, a memory 12, a storage 13, an a communication interface 14. The processor 11 is connected with other hardware components through signal lines and controls these other hardware components.

The common parameter generation device 10 includes, as functional components, an acquisition unit 111, a parameter generation unit 112, and an output unit 113. The functions of the functional components of the common parameter generation device 10 are realized by software.

The storage 13 stores programs that realize the functions of the functional components of the common parameter generation device 10. These programs are read into the memory 12 by the processor 11 and executed by the processor 11. This realizes the functions of the functional components of the common parameter generation device 10.

Figure 7:
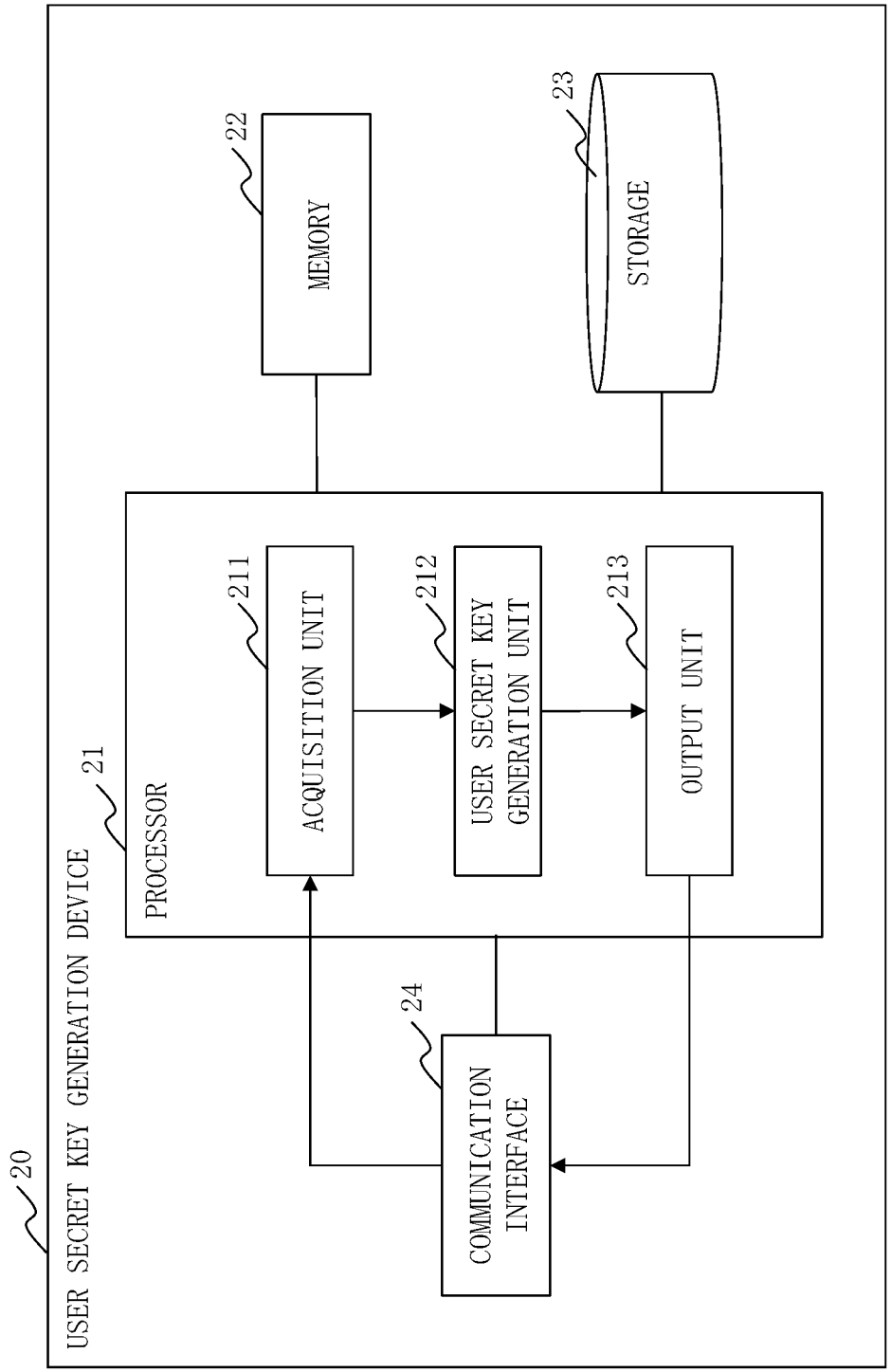
FIG. 7 is a configuration diagram of a user secret key generation device 20 according to the first embodiment.

Referring to FIG. 7, a configuration of the user secret key generation device 20 according to the first embodiment will be described.

The user secret key generation device 20 is a computer.

The user secret key generation device 20 includes hardware of a processor 21, a memory 22, a storage 23, and a communication interface 24. The processor 21 is connected with other hardware components through signal lines and controls these other hardware components.

The user secret key generation device 20 includes, as functional components, an acquisition unit 211, a user secret key generation unit 212, and an output unit 213.

The functions of the functional components of the user secret key generation device 20 are realized by software.

The storage 23 stores programs that realize the functions of the functional components of the user secret key generation device 20. These programs are read into the memory 22 by the processor 21 and executed by the processor 21. This realizes the functions of the functional components of the user secret key generation device 20.

Figure 8:
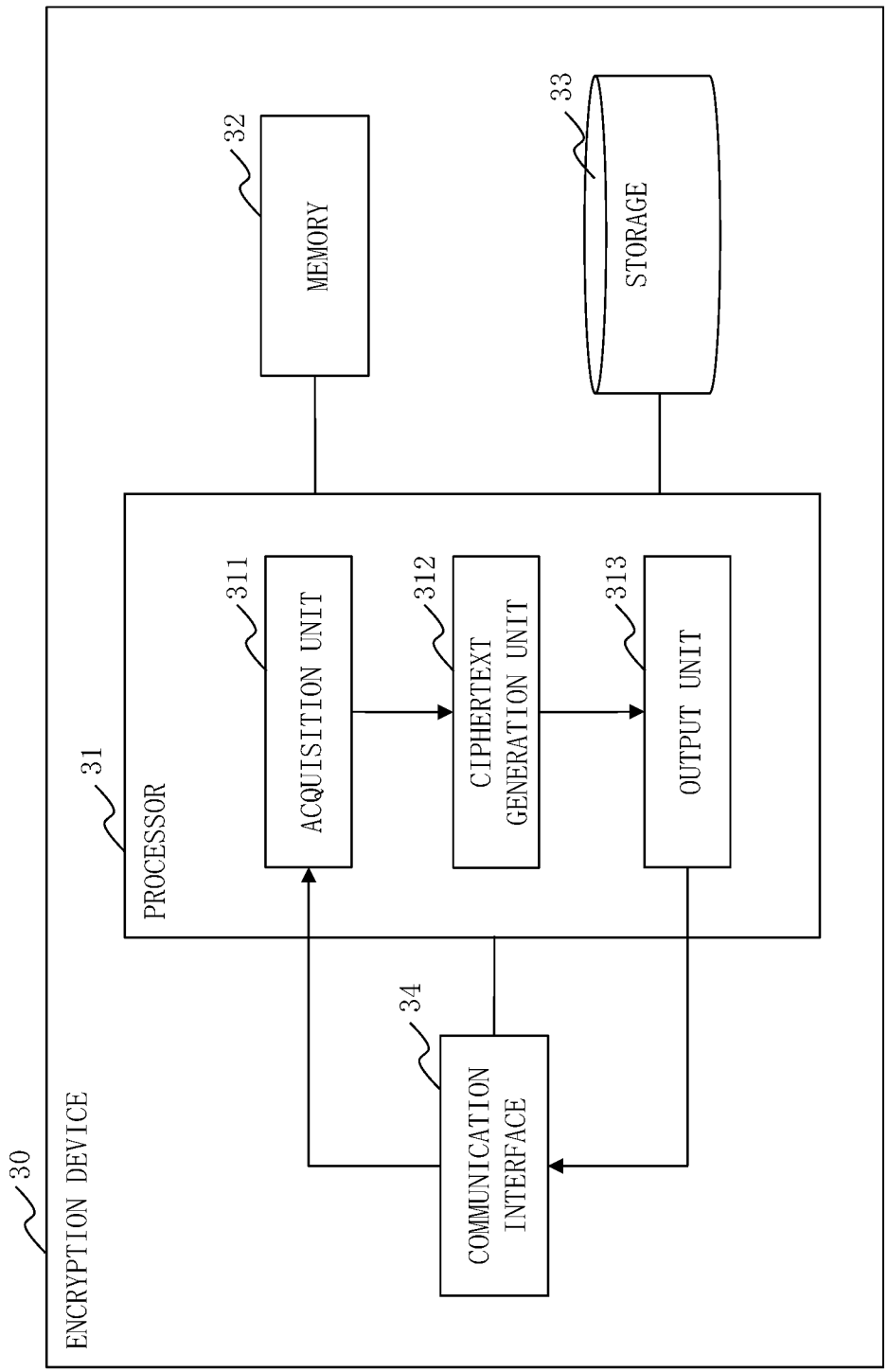
FIG. 8 is a configuration diagram of an encryption device 30 according to the first embodiment.

Referring to FIG. 8, a configuration of the encryption device 30 according to the first embodiment will be described.

The encryption device 30 is a computer.

The encryption device 30 includes hardware of a processor 31, a memory 32, a storage 33, and a communication interface 34. The processor 31 is connected with other hardware components through signal lines and controls these other hardware components.

The encryption device 30 includes, as functional component, an acquisition unit 311, a ciphertext generation unit 312, and an output unit 313. The functions of the functional components of the encryption device 30 are realized by software.

The storage 33 stores programs that realize the functions of the functional components of the encryption device 30. These programs are read into the memory 32 by the processor 31 and executed by the processor 31. This realizes the functions of the functional components of the encryption device 30.

Figure 9:
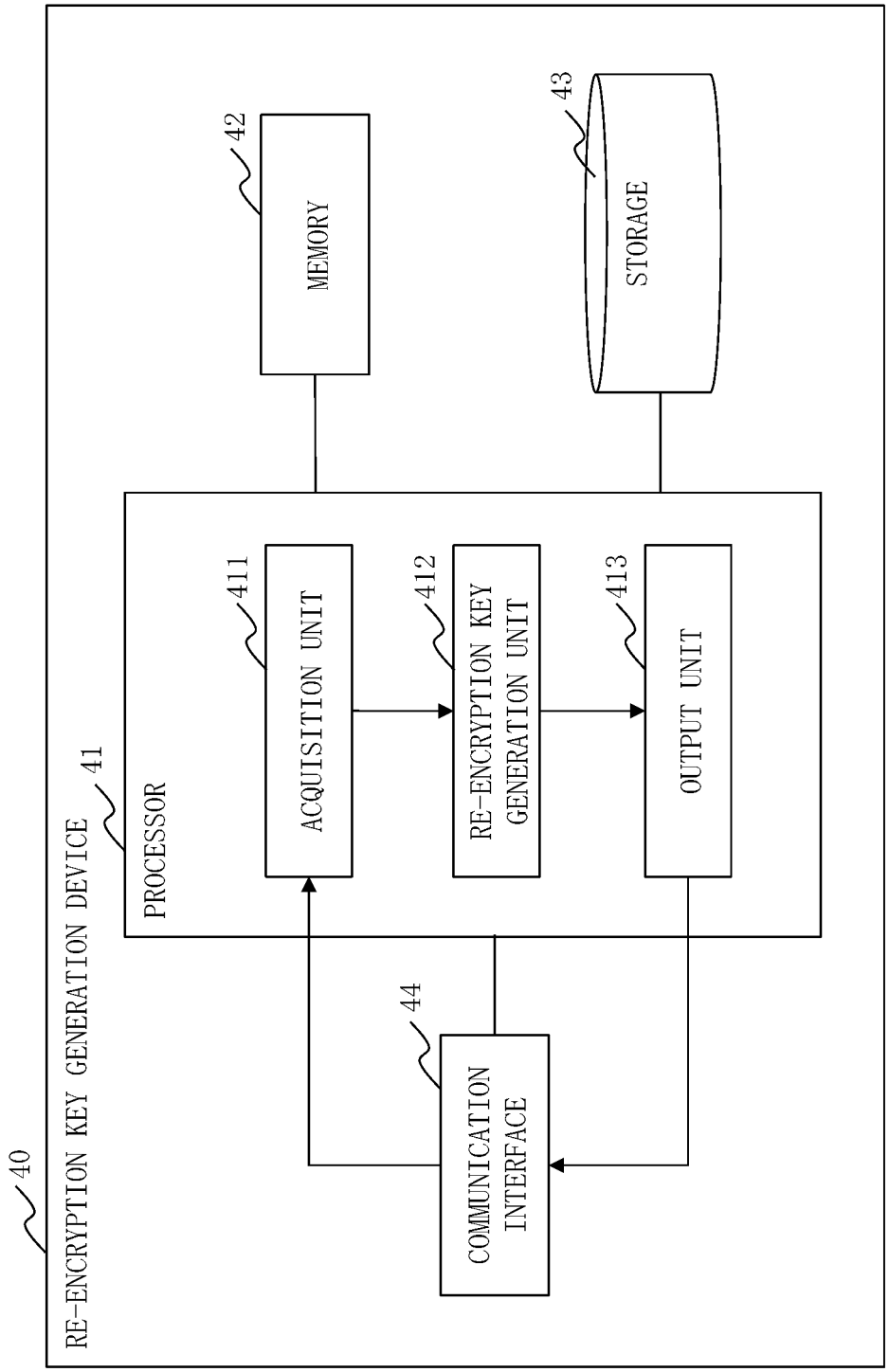
FIG. 9 is a configuration diagram of a re-encryption key generation device 40 according to the first embodiment.

Referring to FIG. 9, a configuration of the re-encryption key generation device 40 according to the first embodiment will be described.

The re-encryption key generation device 40 is a computer.

The re-encryption key generation device 40 includes hardware of a processor 41, a memory 42, a storage 43, and a communication interface 44. The processor 41 is connected with other hardware components through signal lines and controls these other hardware components.

The re-encryption key generation device 40 includes, as functional components, an acquisition unit 411, a re-encryption key generation unit 412, and an output unit 413. The functions of the functional components of the re-encryption key generation device 40 are realized by software.

The storage 43 stores programs that realize the functions of the functional components of the re-encryption key generation device 40. These programs are read into the memory 42 by the processor 41 and executed by the processor 41. This realizes the functions of the functional components of the re-encryption key generation device 40.

Figure 10:
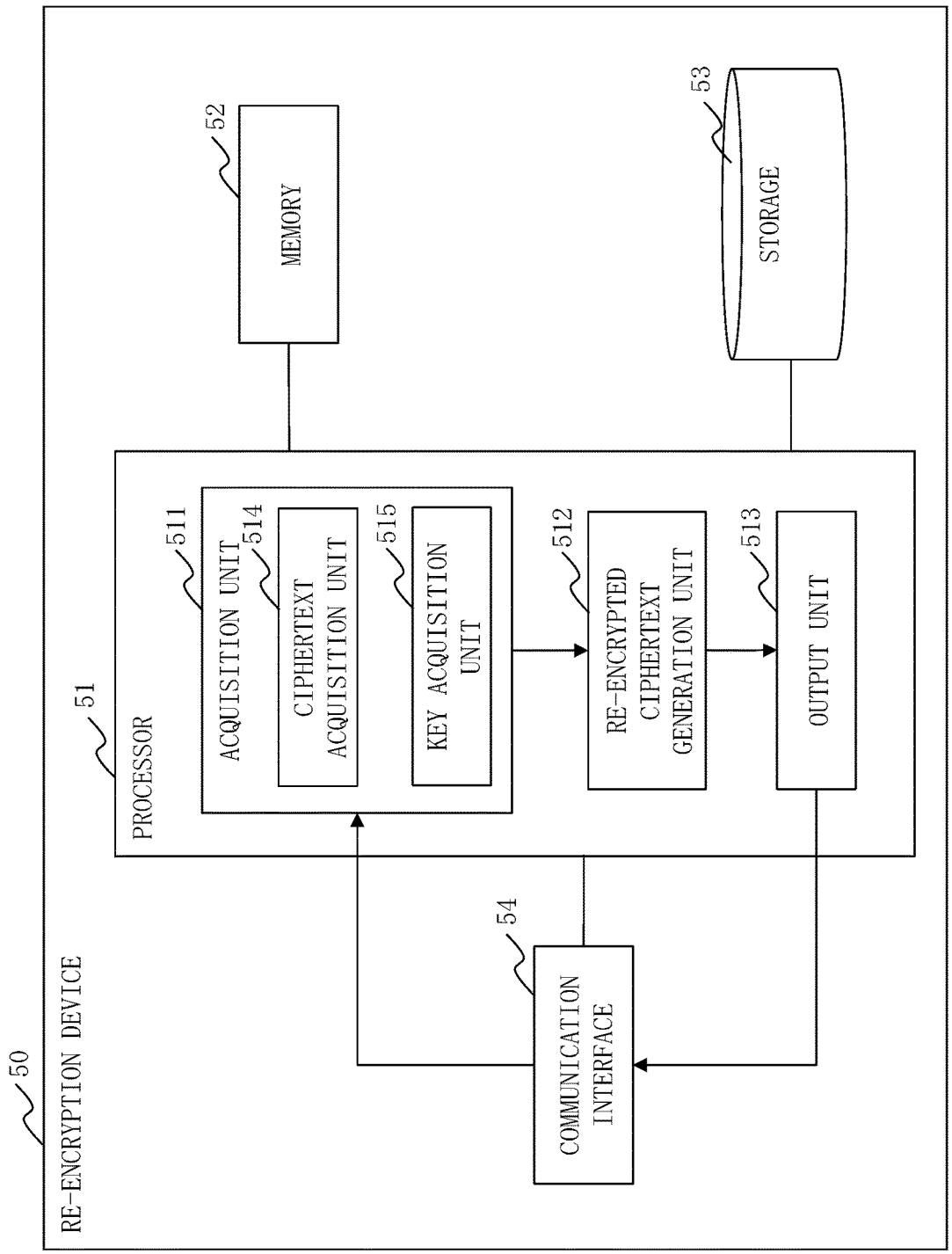
FIG. 10 is a configuration diagram of a re-encryption device 50 according to the first embodiment.

Referring to FIG. 10, a configuration of the re-encryption device 50 according to the first embodiment will be described.

The re-encryption device 50 is a computer.

The re-encryption device 50 includes hardware of a processor 51, a memory 52, a storage 53, and a communication interface 54. The processor 51 is connected with other hardware components through signal lines and controls these other hardware components.

The re-encryption device 50 includes, as functional components, an acquisition unit 511, a re-encrypted ciphertext generation unit 512, and an output unit 513. The acquisition unit 511 includes a ciphertext acquisition unit 514 and a key acquisition unit 515. The functions of the functional components of the re-encryption device 50 are realized by software.

The storage 53 stores programs that realize the functions of the functional components of the re-encryption device 50. These programs are read into the memory 52 by the processor 51 and executed by the processor 51. This realizes the functions of the functional components of the re-encryption device 50.

Figure 11:
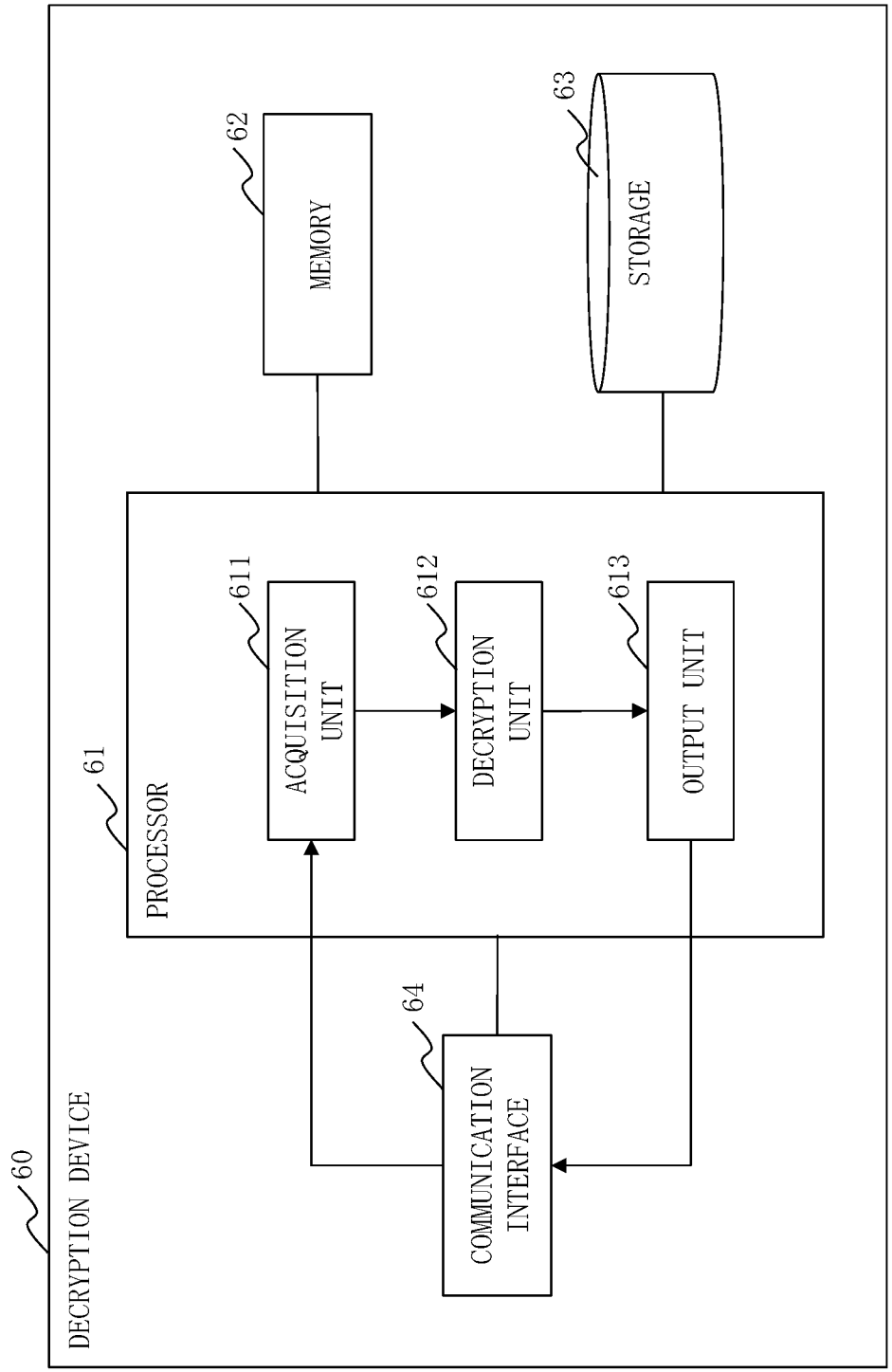
FIG. 11 is a configuration diagram of a decryption device 60 according to the first embodiment.

Referring to FIG. 11, a configuration of the decryption device 60 according to the first embodiment will be described.

The decryption device 60 is a computer.

The decryption device 60 includes a hardware of a processor 61, a memory 62, a storage 63, and a communication interface 64. The processor 61 is connected with other hardware components through signal lines and controls these other hardware components.

The decryption device 60 includes, as functional components, an acquisition unit 611, a decryption unit 612, and an output unit 613. The functions of the functional components of the decryption device 60 are realized by software.

The storage 63 stores programs that realize the functions of the functional components of the decryption device 60. These programs are read into the memory 62 by the processor 61 and executed by the processor 61. This realizes the functions of the functional components of the decryption device 60.

Each of the processors 11, 21, 31, 41, 51, and 61 is an integrated circuit (IC) that performs processing. Specific examples of each of the processors 11, 21, 31, 41, 51, and 61 are a central processing unit (CPU), a digital signal processor (DSP), and a graphics processing unit (GPU).

Each of the memories 12, 22, 32, 42, 52, and 62 is a storage device to temporarily store data. Specific examples of each of the memories 12, 22, 32, 42, 52, and 62 are a static random access memory (SRAM) and a dynamic random access memory (DRAM).

Each of the storages 13, 23, 33, 43, 53, and 63 is a storage device to store data. A specific example of each of the storages 13, 23, 33, 43, 53, and 63 is a hard disk drive (HDD). Alternatively, each of the storages 13, 23, 33, 43, 53, and 63 may be a portable recording medium such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 14, 24, 34, 44, 54, and 64 is an interface for communicating with external devices. Specific examples of each of the communication interfaces 14, 24, 34, 44, 54, and 64 is an Ethernet (registered trademark) port, a Universal Serial Bus (USB) port, and a High-Definition Multimedia Interface (HDMI, registered trademark) port.

FIG. 6 illustrates only one processor 11. However, a plurality of processors 11 may be included, and the plurality of processors 11 may cooperatively execute the programs that realize the respective functions.

Similarly, a plurality of processors 21, a plurality of processors 31, a plurality of processors 41, a plurality of processors 51, and a plurality of processors 61 may be included, and the plurality of processors 21, the plurality of processors 31, the plurality of processors 41, the plurality of processors 51, and the plurality of processors 61 may cooperatively execute the programs that realize the respective functions.

\*\*\*Description of Operation\*\*\*

Referring to FIGS. 12 to 18, operation of the cryptographic system 100 according to the first embodiment will be described.

The cryptographic system 100 according to the first embodiment realizes AB-PRE. A key encapsulation mechanism (KEM)-data encapsulation mechanism (DEM) framework is assumed here and an example in which AB-PRE is used as KEM will be described.

AB-PRE includes a Setup algorithm, a KG algorithm, an RKG algorithm, an Enc algorithm, an REnc algorithm, and a Dec algorithm.

The Setup algorithm is a probabilistic algorithm that takes as input a security parameter $1^\lambda$ and space information $\vec{n}$ and outputs a public key pk and a master secret key msk.

The KG algorithm is a probabilistic algorithm that takes as input the public key pk, the master secret key msk, and attribute information $\Gamma$, and outputs a decryption key $sk_\Gamma$.

The Enc algorithm is a probabilistic algorithm that takes as input the public key pk and attribute information S, and outputs a ciphertext $ct_S$ and a session key K.

The RKG algorithm is a probabilistic algorithm that takes as input the public key pk, the decryption key $sk_\Gamma$, and attribute information S', and outputs a re-encryption key rk.

The REnc algorithm is a probabilistic algorithm that takes as input the public key pk, the re-encryption key rk, and the ciphertext $ct_S$, and outputs a re-encrypted ciphertext $rct_{S'}$.

The Dec algorithm is a deterministic algorithm that takes as input the public key pk, the decryption key $sk_\Gamma$, and one of the ciphertext $ct_S$ and the re-encrypted ciphertext $rct_{S'}$, and outputs the session key K.

In the first embodiment, the attribute information S and the attribute information S' are equivalent to the access structure S:=(M, $\rho$) described above.

Figure 12:
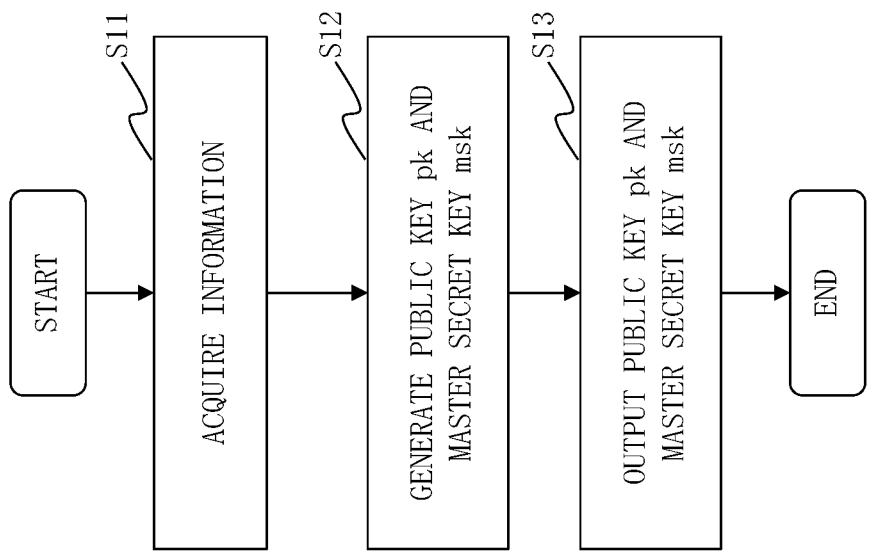
FIG. 12 is a flowchart illustrating operation of the common parameter generation device 10 according to the first embodiment.

Referring to FIG. 12, operation of the common parameter generation device 10 according to the first embodiment will be described.

A procedure for the operation of the common parameter generation device 10 according to the first embodiment is equivalent to a common parameter generation method according to the first embodiment. A program that realizes the operation of the common parameter generation device 10 according to the first embodiment is equivalent to a common parameter generation program according to the first embodiment.

The common parameter generation device 10 executes the Setup algorithm.

(Step S11: Acquisition Process)

The acquisition unit 111 acquires a security parameter $1^\lambda$ and space information $\vec{n}:=(d; n_1, \ldots, n_d)$.

Specifically, the acquisition unit 111 acquires the security parameter $1^\lambda$ and the space information $\vec{n}$ that are input by an administrator or the like of the cryptographic system 100 via the communication interface 14. The acquisition unit 111 writes the security parameter $1^\lambda$ and the space information $\vec{n}$ in the memory 12. The space information $\vec{n}$ is a parameter that determines a configuration such as the number of dimensions of dual pairing vector spaces used by the cryptographic system 100.

(Step S12: Parameter Generation Process)

The parameter generation unit 112 generates a public key pk and a master secret key msk, using as input the security parameter $1^\lambda$ and the space information $\vec{n}$ acquired in step S11.

Specifically, the parameter generation unit 112 executes an algorithm Gob indicated in Formula 130, using as input the security parameter $1^\lambda$ and the space information $\vec{n}$, so as to generate $param_n$, an element $g_T$, and bases $\{\mathbb{B}_t, \mathbb{B}^*_t\}_{t=0,\ldots,d}$.

[Formula 130]

$$(param_n, g_T, (\mathbb{B}_t, \mathbb{B}^*_t)_{t=0,\ldots,d}) \leftarrow G_{ob}(1^\lambda, \vec{n} = (d; n_1, \ldots, n_d))$$
where
$$G_{ob}(1^\lambda, \vec{n} = (d; n_1, \ldots, n_d))$$
$$param_G := (q, \mathbb{G}, \mathbb{G}_T, g, e) \leftarrow G_{bpg}(1^\lambda),$$

$$N_0 := 6, N_t := 3n_t + 1 \text{ for } t = 1, \ldots, d, \psi \xleftarrow{U} \mathbb{F}_q^\times, g_T = e(g, g)^\psi,$$

for $t = 0, \ldots, d$, $$param_{\mathbb{V}_t} := \left(q, \mathbb{V}_t, \mathbb{G}_t, \mathbb{A}_t, e\right) \xleftarrow{R} G_{dpvs}(1^\lambda, N_t),$$

$$X_t := \begin{pmatrix} \vec{\mathcal{X}}_{t,1} \\ \vdots \\ \vec{\mathcal{X}}_{t,N_t} \end{pmatrix} := (\mathcal{X}_{t,i,j})_{i,j} \xleftarrow{U} GL(N_t, \mathbb{F}_q),$$

$$X_t := \begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$

$param_n := (\{param_{\mathbb{V}_t}\}_{t=0,\ldots,d}),$
$b_{t,i} := \sum_{j=1}^{N_t} \mathcal{X}_{t,i,j} a_{t,j}, \mathbb{B}_t := (b_{t,1}, \ldots, b_{t,N_t}),$
$b_{t,i}^* := \sum_{j=1}^{N_t} v_{t,i,j} a_{t,j}, \mathbb{B}_t^* := (b_{t,1}^*, \ldots, b_{t,N_t}^*),$
return $param_n, g_T, \{\mathbb{B}_t, \mathbb{B}^*_t\}_{t=0,\ldots,d}.$ The parameter generation unit 112 generates subbases $\{\hat{\mathbb{B}}_t, \hat{\mathbb{B}}^*_t\}_{t=0,\ldots,d}$ based on the bases $\{\mathbb{B}_t, \mathbb{B}^*_t\}_{t=0,\ldots,d}$ as indicated in Formula 131.

$\hat{\mathbb{B}}_0 := (b_{0,1}, b_{0,2}, b_{0,5}),$ $\hat{\mathbb{B}}_t := (b_{t,1}, \ldots, b_{t,n_t}, b_{t,N_t})$ for $t=1, \ldots, d,$ $\hat{\mathbb{B}}^*_0 := (b^*_{0,1}, b^*_{0,2}, b^*_{0,4}),$ $\hat{\mathbb{B}}^*_t := (b^*_{t,1}, \ldots, b^*_{t,n_t}, b^*_{t,2n_t+1}, \ldots b^*_{t,3n_t})$
for $t=1, \ldots, d$ [Formula 131]

The parameter generation unit 112 generates an element a, an element A, and an element c, as indicated in Formula 132.

$$a \xleftarrow{U} \mathbb{F}_q, A := g_T^a,$$ [Formula 132]

$$\eta \xleftarrow{U} \mathbb{F}_q, c := (0, 0, 0, 0, \eta, a)_{\mathbb{B}_0}$$

The parameter generation unit 112 sets the security parameter $1^\lambda$, the $param_n$, the element $g_T$, the subbasis $\{\hat{\mathbb{B}}_t\}_{t=0,\ldots,d}$, the element A, and the element c in the public key pk. The parameter generation unit 112 sets the subbasis $\{\hat{\mathbb{B}}^*_t\}_{t=0,\ldots,d}$, the element a, and a basis vector $b^*_{0,6}$ in the master secret key msk.

(Step S13: Output Process)

The output unit 113 outputs the public key pk and the master secret key msk that are generated in step S12.

Specifically, the output unit 113 transmits the public key pk, via the communication interface 14, to each of the user secret key generation devices 20, each of the encryption devices 30, the re-encryption key generation device 40, the re-encryption device 50, and the decryption device 60. The output unit 113 transmits the master secret key msk to each of the user secret key generation devices 20 via the communication interface 14. At this time, the output unit 113 transmits the master secret key msk after making it confidential by a method such as encryption using an existing encryption algorithm.

Each of the public key pk and the master secret key msk may be stored in a storage medium and sent by postal mail instead of being transmitted via the communication interface 14.

That is, the common parameter generation device 10 executes the Setup algorithm indicated in Formula 133.

[Formula 133]

$$\text{Setup}(1^\lambda, \vec{n} = (d; n_1, \ldots, n_d)):$$
$$(\text{param}_n, g_T, (\mathbb{B}_t, \mathbb{B}_t^*)_{t=0,\ldots,d}) \leftarrow G_{ob}(1^\lambda, \vec{n} = (d; n_1, \ldots, n_d)),$$
$$\hat{\mathbb{B}}_0 := (b_{0,1}, b_{0,2}, b_{0,5}),$$
$$\hat{\mathbb{B}}_t := (b_{t,1}, \ldots, b_{t,n_t}, b_{t,N_t}) \text{ for } t = 1, \ldots, d,$$
$$\hat{\mathbb{B}}_0^* := (b_{0,1}^*, b_{0,2}^*, b_{0,4}^*),$$
$$\hat{\mathbb{B}}_t^* := (b_{t,1}^*, \ldots, b_{t,n_t}^*, b_{t,2n_t+1}^*, b_{t,3n_t+1}^*) \text{ for } t = 1, \ldots, d,$$

$$a \xleftarrow{U} \mathbb{F}_q, A := g_T^a,$$

$$\eta \xleftarrow{U} \mathbb{F}_q, c := (0, 0, 0, 0, \eta, a)_{\mathbb{B}_0},$$

$$\text{return pk} := (1^\lambda, \text{param}_n, g_T, \{\hat{\mathbb{B}}_t\}_{t=0,\ldots,d}, A, c),$$
$$\text{msk} := (\{\hat{\mathbb{B}}_t^*\}_{t=0,\ldots,d}, a, b_{0,6}^*).$$

Figure 13:
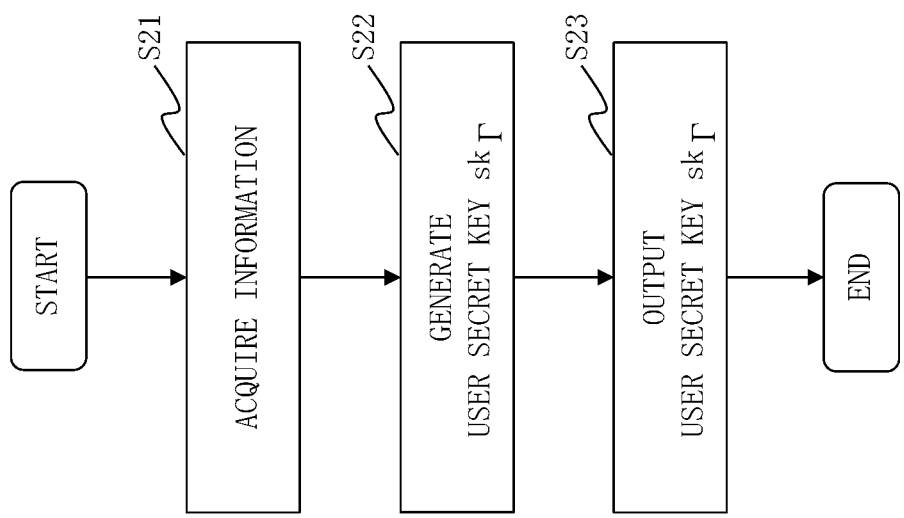
FIG. 13 is a flowchart illustrating operation of the user secret key generation device 20 according to the first embodiment.

Referring to FIG. 13, operation of the user secret key generation device 20 according to the first embodiment will be described.

A procedure for the operation of the user secret key generation device 20 according to the first embodiment is equivalent to a user secret key generation method according to the first embodiment. A program that realizes the operation of the user secret key generation device 20 according to the first embodiment is equivalent to a user secret key generation program according to the first embodiment.

The user secret key generation device 20 executes the KG algorithm.

(Step S21: Acquisition Process)

The acquisition unit 211 acquires the public key pk, the master secret key msk, and attribute information $\Gamma:=\{t, \vec{x}_t | \vec{x}_t \in \mathbb{F}_q^{n_t}\backslash\{\vec{0}\}, 1 \le t \le d\}$.

Specifically, the acquisition unit 211 receives, via the communication interface 24, the public key pk and the master secret key msk that are transmitted by the common parameter generation device 10. The acquisition unit 211 acquires the attribute information F that is input by a user or the like of the user secret key generation device 20 via the communication interface 14. The acquisition unit 211 writes the public key pk, the master secret key msk, and the attribute information $\Gamma$ in the memory 22.

The attribute information $\Gamma$ indicates attributes such as a belonging organization and a position of the user of a decryption key $sk_\Gamma$. For example, a type of attribute is assigned to each t, and an attribute of the type assigned to t is set in $\vec{x}_t$. As a specific example, a belonging company is assigned to t=1, a belonging division is assigned to t=2, a belonging section is assigned to t=3, and a position is assigned to t=4. Then, the company to which the user belongs is set in $\vec{x}_1$, the division to which the user belongs is set in $\vec{x}_2$, the section to which the user belongs is set in $\vec{x}_3$, and the position of the user is set in $\vec{x}_4$.

(Step S22: User Secret Key Generation Process)

The user secret key generation unit 212 generates the decryption key $sk_\Gamma$, using as input the public key pk, the master secret key msk, and the attribute information $\Gamma$ that are acquired in step S21.

Specifically, the user secret key generation unit 212 generates random numbers, as indicated in Formula 134.

$$\delta, \varphi_0 \xleftarrow{U} \mathbb{F}_q, \vec{\varphi}_t \xleftarrow{U} \mathbb{F}_q^{n_t} \text{ for } (t, \vec{x}_t) \in \Gamma \quad \text{[Formula 134]}$$

The user secret key generation unit 212 generates a key element $k^*_0$ and a key element $k^*_t$ for each t included in the attribute information $\Gamma$, as indicated in Formula 135.

$$k_0^* := (1, \delta, 0, \varphi_0, 0, 0)_{\mathbb{B}_0^*}, \quad \text{[Formula 135]}$$

$$k_t^* := \left(\overbrace{\delta\vec{x}_t}^{n_t}, \overbrace{0^{n_t}}^{n_t}, \overbrace{\vec{\varphi}_t}^{n_t}, \overbrace{0}^{1}\right)_{\mathbb{B}_t^*} \text{ for } (t, \vec{x}_t) \in \Gamma$$

(Step S23: Output Process)

The output unit 213 outputs, as the decryption key $sk_\Gamma$, the attribute information $\Gamma$, the key element $k^*_0$ and the key elements $k^*_t$ generated in step S22, and the basis vector $b^*_{0,6}$.

Specifically, the output unit 213 transmits the decryption key $sk_\Gamma$, via the communication interface 24, to the re-encryption key generation device 40 and the decryption device 60. At this time, the output unit 213 transmits the decryption key $sk_\Gamma$ after making it confidential by a method such as encryption using an existing encryption algorithm.

The decryption key $sk_\Gamma$ may be stored in a storage medium and sent by postal mail instead of being transmitted via the communication interface 24.

That is, the user secret key generation device 20 executes the KG algorithm indicated in Formula 136.

[Formula 136]

$$\text{KG}(\text{pk}, \text{msk}, \Gamma := (\{(t, \vec{x}_t) \mid \vec{x}_t \in \mathbb{F}_q^{n_t}\backslash\{\vec{0}\}, 1 \le t \le d\})):$$

$$\delta, \varphi_0 \xleftarrow{U} \mathbb{F}_q, \vec{\varphi}_0 \xleftarrow{U} \mathbb{F}_q^{n_t} \text{ for } (t, \vec{x}_t) \in \Gamma,$$

$$k_0^* := (1, \delta, 0, \varphi_0, 0, 0)_{\mathbb{B}_0^*},$$

$$k_t^* := (\overbrace{\delta\vec{x}_t}^{n_t}, \overbrace{0^{n_t}}^{n_t}, \overbrace{\vec{\varphi}_t}^{n_t}, \overbrace{0}^{1})_{\mathbb{B}_t^*} \text{ for } (t, \vec{x}_t) \in \Gamma,$$

$$\text{return } sk_\Gamma := (\Gamma, k_0^*, \{k_t^*\}_{(t, \vec{x}_t) \in \Gamma}, b_{0,6}^*).$$

Figure 14:
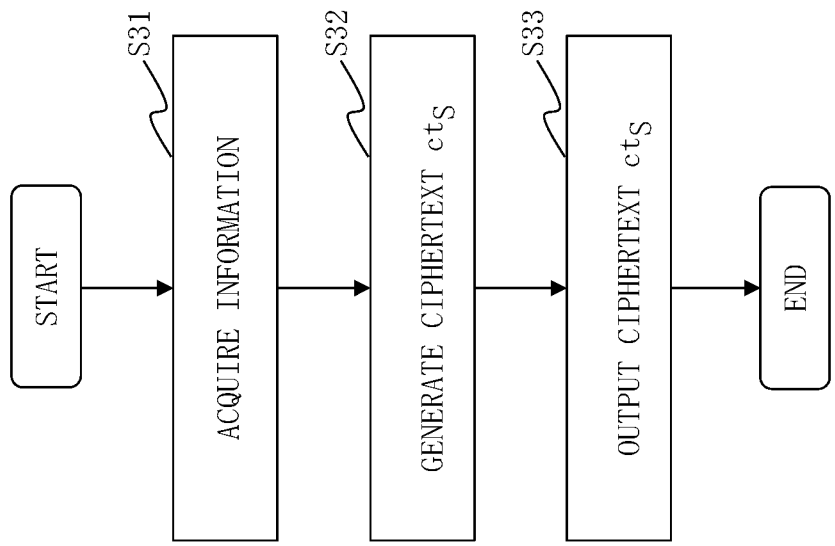
FIG. 14 is a flowchart illustrating operation of the encryption device 30 according to the first embodiment.

Referring to FIG. 14, operation of the encryption device 30 according to the first embodiment will be described.

A procedure for the operation of the encryption device 30 according to the first embodiment is equivalent to an encryption method according to the first embodiment.

A program that realizes the operation of the encryption device 30 according to the first embodiment is equivalent to an encryption program according to the first embodiment.

The encryption device 30 executes the Enc algorithm.

(Step S31: Acquisition Process)

The acquisition unit 311 acquires the public key pk and attribute information $S=(M, \rho)$.

Specifically, the acquisition unit 311 receives, via the communication interface 34, the public key pk transmitted by the common parameter generation device 10. The acquisition unit 311 acquires the attribute information S that is input by a user or the like of the encryption device 30 via the communication interface 14. The acquisition unit 311 writes the public key pk and the attribute information S in the memory 32.

The attribute information S indicates a range of attributes to be permitted to decrypt a ciphertext $ct_S$. Specifically, the attribute information S indicates the range of attributes to be permitted to decrypt the ciphertext $ct_S$, as a conditional expression using logical OR and logical AND.

(Step S32: Ciphertext generation process)

The ciphertext generation unit 312 generates the ciphertext $ct_S$, using as input the public key pk and the attribute information S that are acquired in step S31.

Specifically, the ciphertext generation unit 312 generates distributed information $S_i$ for each integer i of i=1, ..., L and secret information $S_0$, as indicated in Formula 137.

$$\vec{f} \xleftarrow{U} \mathbb{F}_q^r,$$

$$\vec{s}^T := (s_1, \ldots, s_L)T := M \cdot \vec{f}^T,$$

$$s_0 := \vec{f}^T$$

[Formula 137]

The ciphertext generation unit 312 generates random numbers, as indicated in Formula 138.

$$\eta_0, \varsigma \xleftarrow{U} \mathbb{F}_q$$

[Formula 138]

The ciphertext generation unit 312 generates a cipher element $c_0$, as indicated in Formula 139.

$$c_0 := (\varsigma, -s_0, 0, 0, \eta_0, 0)_{\mathbb{B}_0}$$

[Formula 139]

The ciphertext generation unit 312 generates a session key K, as indicated in Formula 140.

$$K := g_T^\varsigma$$

[Formula 140]

The ciphertext generation unit 312 generates a cipher element ci for each integer i of i=1, ..., L, as indicated in Formula 141.

[Formula 141]
for i = 1, ..., L,
  if $\rho(i) = (t, \vec{v}_i := (v_{i,1}, \ldots, v_{i,n_t}) \in \mathbb{F}_q^{n_t}\setminus\{\vec{0}\})(v_{i,n_t} \neq 0)$, $$\theta_i, \eta_i \xleftarrow{U} \mathbb{F}_q,$$

$$c_i := (s_i \vec{e}_{t,1} + \theta_i \vec{v}_i, \overbrace{0^{n_t}}^{n_t}, \overbrace{0^{n_t}}^{n_t}, \overbrace{\eta_i}^{1})_{\mathbb{B}_t},$$

if $\rho(i) = \neg(t, \vec{v}_i)$, $$\eta_i \xleftarrow{U} \mathbb{F}_q,$$

$$c_i := (s_i \vec{v}_i, \overbrace{0^{n_t}}^{n_t}, \overbrace{0^{n_t}}^{n_t}, \overbrace{\eta_i}^{1})_{\mathbb{B}_t}$$

(Step S33: Output Process) The output unit 313 outputs the ciphertext $ct_S$ including the attribute information S and the cipher element ci for each integer i of i=0, ..., L generated in step S32, and the session K generated in step S32.

Specifically, the output unit 313 transmits the ciphertext $ct_S$, via the communication interface 34, to the re-encryption device 50 and the decryption device 60. The output unit 313 writes the session key K in the memory 32.

That is, the encryption device 30 executes the Enc algorithm indicated in Formula 142.

[Formula 142]
Enc (pk, $\mathbb{S}$ := (M, ρ)):

$$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$$

$$\eta_0, \varsigma \xleftarrow{U} \mathbb{F}_q, c_0 := (\varsigma, -s_0, 0, 0, \eta_0, 0)_{\mathbb{B}_0}, K := g_T^\varsigma,$$

for i = 1, ..., L,
  if $\rho(i) = (t, \vec{v}_i := (v_{i,1}, \ldots, v_{i,n_t}) \in \mathbb{F}_q^{n_t}\setminus\{\vec{0}\})(v_{i,n_t} \neq 0)$, $$\theta_i, \eta_i \xleftarrow{U} \mathbb{F}_q,$$

$$c_i := (s_i \vec{e}_{t,1} + \theta_i \vec{v}_i, \overbrace{0^{n_t}}^{n_t}, \overbrace{0^{n_t}}^{n_t}, \overbrace{\eta_i}^{1})_{\mathbb{B}_t},$$

if $\rho(i) = \neg(t, \vec{v}_i)$, $$\eta_i \xleftarrow{U} \mathbb{F}_q,$$

$$c_i := (s_i \vec{v}_i, \overbrace{0^{n_t}}^{n_t}, \overbrace{0^{n_t}}^{n_t}, \overbrace{\eta_i}^{1})_{\mathbb{B}_t},$$

return $ct_\mathbb{S} := (\mathbb{S}, \{c_i\}_{i=0, \ldots, L}), K.$

Figure 15:
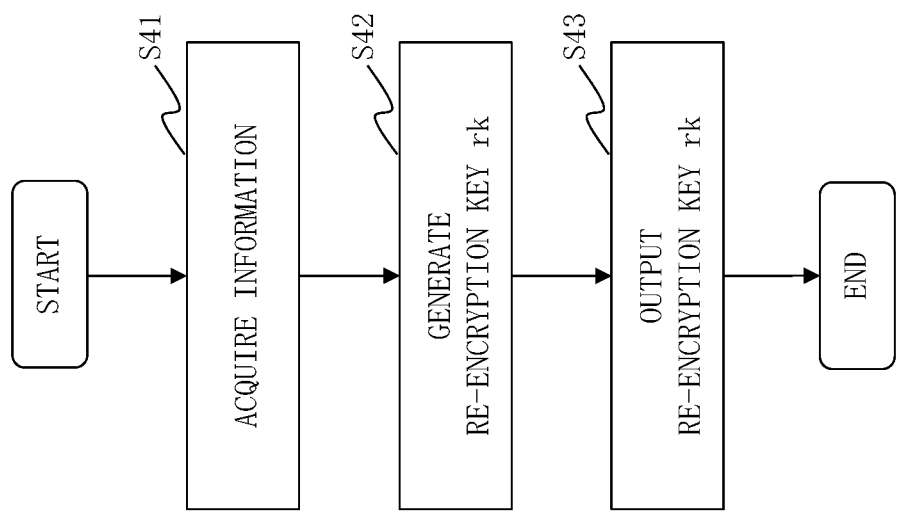
FIG. 15 is a flowchart illustrating operation of the re-encryption key generation device 40 according to the first embodiment.

Referring to FIG. 15, operation of the re-encryption key generation device 40 according to the first embodiment will be described.

A procedure for the operation of the re-encryption key generation device 40 according to the first embodiment is equivalent to a re-encryption key generation method according to the first embodiment. A program that realizes the operation of the re-encryption key generation device 40 according to the first embodiment is equivalent to a re-encryption key generation program according to the first embodiment.

The re-encryption key generation device 40 executes the RKG algorithm.

(Step S41: Acquisition Process)

The acquisition unit 411 acquires the public key pk, the decryption key $sk_\Gamma$, and attribute information S':=(M, ρ).

Specifically, the acquisition unit 411 receives, via the communication interface 44, the public key pk transmitted by the common parameter generation device 10. The acquisition unit 411 receives, via the communication interface 44, the decryption key $sk_\Gamma$ transmitted by the user secret key generation device 20. The acquisition unit 411 acquires the attribute information S' that is input by a user or the like of the re-encryption key generation device 40 via the communication interface 14. The acquisition unit 411 writes the public key pk, the decryption key $sk_\Gamma$, and the attribute information S' in the memory 42.

The attribute information S' indicates a range of attributes to be permitted to decrypt a re-encrypted ciphertext $rct_{S'}$. Specifically, like the attribute information S, the attribute information S' indicates the range of attributes to be permitted to decrypt the re-encrypted ciphertext $rct_{S'}$, as a conditional expression using logical OR and logical AND.

(Step S42: Re-Encryption Key Generation Process)

The re-encryption key generation unit 412 generates the re-encryption key rk, using as input the public key pk, the decryption key $sk_\Gamma$, and the attribute information S' that are acquired in step S41.

Specifically, the re-encryption key generation unit 412 generates a random number, as indicated in Formula 143.

$$r \xleftarrow{U} \mathbb{F}_q \qquad \text{[Formula 143]}$$

The re-encryption key generation unit 412 generates a converted decryption key $\tilde{sk}_\Gamma$, as indicated in Formula 144.

$$\tilde{sk}_\Gamma := (\Gamma, k^*_0 + rb^*_{0,6}, \{k^*_t\}_{(t,\vec{x}_t) \in \Gamma})$$

As a result, $k^*_0$ included in the converted decryption key $\tilde{sk}_\Gamma$ is as indicated in Formula 145.

$$k^*_0 := (1, \delta, 0, \varphi_0, 0, r)_{\mathbb{B}^*_0} \qquad \text{[Formula 145]}$$

The re-encryption key generation unit 412 executes the Enc algorithm, using as input the public key pk and the attribute information S', so as to generate a ciphertext $ct_{S'}$ and a session key K', as indicated in Formula 146.

$$(ct_{\mathbb{S}'}, K') \leftarrow Enc(pk, \mathbb{S}') \qquad \text{[Formula 146]}$$

That is, the re-encryption key generation unit 412 executes processes of step S32 of FIG. 14, using as input the public key pk and the attribute information S', so as to generate the ciphertext $ct_{S'}$ and the session key K'.

(Step S43: Output Process)

The output unit 413 outputs, as the re-encryption key rk, the converted decryption key $\tilde{sk}_\Gamma$, an element $A^r \cdot K'$, and the ciphertext $ct_{S'}$. The element $A^r \cdot K'$ is obtained by multiplying an element $A^r$, which is obtained from the element A and the random number r included in the pubic key pk, by the session key K'.

Specifically, the output unit 413 transmits the re-encryption key rk to the re-encryption device 50 via the communication interface 44.

That is, the re-encryption key generation device 40 executes the RKG algorithm indicated in Formula 147.

[Formula 147]

$$RKG(pk, sk_\Gamma := (\Gamma, k_0^*, \{k^*_t\}_{(t,\vec{x}_t) \in \Gamma}, b_{0,6}^*), \mathbb{S} := (M', \rho')):$$

$$r \xleftarrow{U} \mathbb{F}_q,$$

$$\tilde{sk}_\Gamma := ((\Gamma, k_0^* + rb_{0,6}^*, \{k^*_t\}_{(t,\vec{x}_t) \in \Gamma}),$$
$$(ct_{\mathbb{S}}, K') \leftarrow Enc(pk, \mathbb{S}'),$$
$$\text{return } rk := (\tilde{sk}_\Gamma, A^r \cdot K', ct_{\mathbb{S}}).$$

Figure 16:
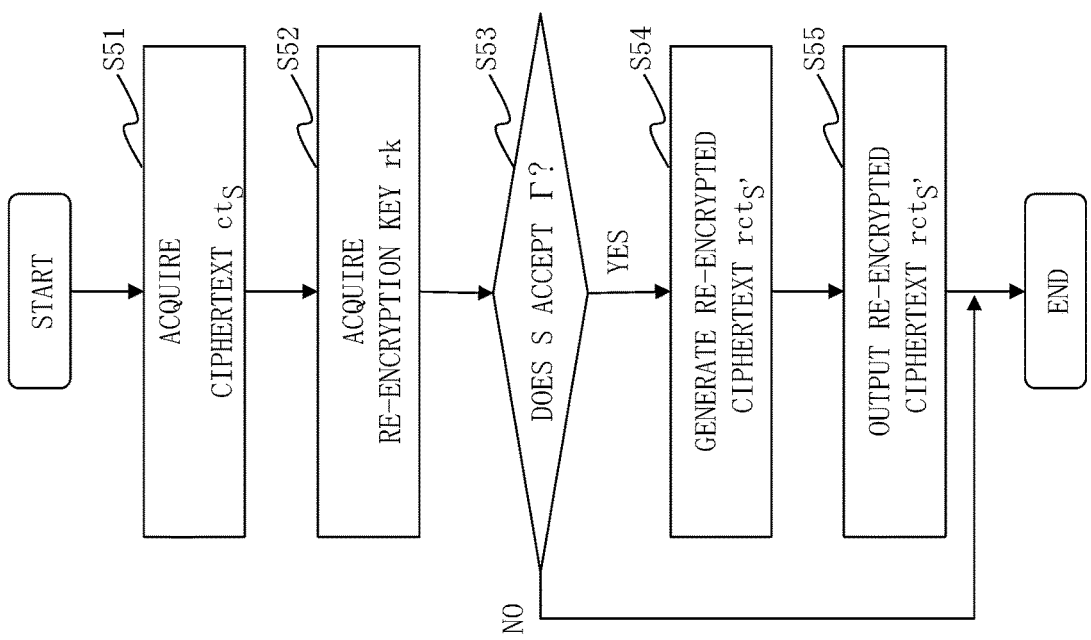
FIG. 16 is a flowchart illustrating operation of the re-encryption device 50 according to the first embodiment.

Referring to FIG. 16, operation of the re-encryption device 50 according to the first embodiment will be described.

A procedure for the operation of the re-encryption device 50 according to the first embodiment is equivalent to a re-encryption method according to the first embodiment. A program that realizes the operation of the re-encryption device 50 according to the first embodiment is equivalent to a re-encryption program according to the first embodiment.

The re-encryption device 50 executes the REnc algorithm.

(Step S51: Ciphertext Acquisition Process)

The ciphertext acquisition unit 514 acquires the ciphertext $ct_S$. That is, the ciphertext acquisition unit 514 acquires the ciphertext $ct_S$ out of the session key K and the ciphertext $ct_S$ in which the session key K is encrypted that are generated by the Enc algorithm, which is an encryption algorithm, using as input the attribute information S that defines the range to be permitted decryption.

Specifically, the ciphertext acquisition unit 514 receives, via the communication interface 54, the ciphertext $ct_S$ transmitted by the encryption device 30. The ciphertext acquisition unit 514 writes the ciphertext $ct_S$ in the memory 52.

(Step S52: Key Acquisition Process)

The key acquisition unit 515 acquires the re-encryption key rk. That is, the key acquisition unit 515 acquires the re-encryption key rk including the converted decryption key $\tilde{sk}_\Gamma$ generated by setting the random number r in the decryption key $sk_\Gamma$ with which the ciphertext $ct_S$ can be decrypted, the session key K' and the ciphertext $ct_{S'}$ in which the session key K' is encrypted that are generated by the Enc algorithm, which is an encryption algorithm, using as input the attribute information S' that defines the range to be permitted decryption, and conversion information $A^r$ generated from the random number r. The key acquisition unit 515 also acquires the public key pk.

Specifically, the key acquisition unit 515 receives, via the communication interface 54, the public key pk transmitted by the common parameter generation device 10 and the re-encryption key rk transmitted by the re-encryption key generation device 40. The key acquisition unit 515 writes the public key pk and the re-encryption key rk in the memory 52.

(Step S53: Determination Process)

The re-encrypted ciphertext generation unit 512 determines whether the attribute information S, which is the access structure included in the ciphertext $ct_S$, accepts the attribute information Γ included in the re-encryption key rk.

If it is accepted, the re-encrypted ciphertext generation unit 512 advances the process to step S54. If it is not accepted, the re-encrypted ciphertext generation unit 512 determines that a re-encrypted ciphertext $rct_{S'}$ cannot be generated and terminates the process.

(Step S54: Re-Encrypted Ciphertext Generation Process)

The re-encrypted ciphertext generation unit 512 generates a re-encrypted ciphertext $rct_{S'}$, using as input the ciphertext $ct_S$ acquired in step S51 and the public key pk and the re-encryption key rk acquired in step S52.

Specifically, the re-encrypted ciphertext generation unit 512 generates decryption information $K^\wedge$ by decrypting the ciphertext $ct_S$ with the converted decryption key $\tilde{sk}_\Gamma$ included in the re-encryption key rk. The re-encrypted ciphertext generation unit 512 generates a cipher element $K^\sim$ by deleting the element related to the random number r from the decryption information $K^\wedge$ by the conversion information $A^r$ and setting the session key K'.

This will be described more specifically.

The re-encrypted ciphertext generation unit 512 calculates an index I and a complementary coefficient $\{\alpha_i\}_{i \in I}$ indicated in Formula 148.

$$\vec{1} = \Sigma_{i \in I} \alpha_i M_i,$$

$$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\} \qquad \text{[Formula 148]}$$

Note that $M_i$ is an i-th row of the matrix M.

The re-encrypted ciphertext generation unit 512 generates the decryption information $K^\wedge$ by decrypting the ciphertext $ct_S$ with the converted decryption key $\tilde{sk}_\Gamma$, as indicated in Formula 149.

$$\hat{K} := e(c_0, k_0^*) \prod_{i \in I \wedge \rho(i)=(t,\vec{v}_i)} e(c_i, k_t^*)^{\alpha_i} \prod_{i \in I \wedge \rho(i)=\neg(t,\vec{v}_i)} e(c_i, k_t^*)^{\alpha_i/(\vec{v}_i \cdot \vec{x}_t)} \quad \text{[Formula 149]}$$

Then, the re-encrypted ciphertext generation unit 512 generates the cipher element K˜ by deleting the element related to the random number r from the decryption information K^ by the element $A^r \cdot K'$ that includes the conversion information $A^r$ and setting the session key K'. Specifically, the re-encrypted ciphertext generation unit 512 generates the cipher element K˜ by dividing the decryption information K^ by the element $A^r \cdot K'$.

(Step S55: Output Process)

The output unit 513 outputs, as the re-encrypted ciphertext $rct_{S'}$, the ciphertext $ct_{S'}$ and the cipher element K˜.

Specifically, the output unit 513 transmits the re-encrypted ciphertext $rct_{S'}$ to the decryption device 60 via the communication interface 54.

That is, the re-encryption device 50 executes the REnc algorithm indicated in Formula 150.

[Formula 150]
$$\text{REnc}(pk, rk := (\tilde{sk}_\Gamma, A^r \cdot K', ct_{\mathbb{S}} \cdot), := (\mathbb{S}, \{c_i\}_{i=0, \ldots, L})):$$
If $\mathbb{S}$ accepts $\Gamma$ then compute I and $\{\alpha_i\}_{i \in I}$ such that
$$\vec{1} = \Sigma_{i \in I} \alpha_i M_i,$$
$$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee$$
$$[\rho(i) = \neg(t, \vec{v}_i) \wedge (t, \vec{x}_t) \in \Gamma \wedge \vec{v}_i \cdot \vec{x}_t \neq 0]\},$$

$$\hat{K} := e(c_0, k_0^*) \prod_{i \in I \wedge \rho(i)=(t,\vec{v}_i)} e(c_i, k_t^*) \alpha_i \prod_{i \in I \wedge \rho(i)=\neg(t,\vec{v}_i)} e(c_i, k_t^*) \alpha_i / (\vec{v}_i \cdot \vec{x}_t),$$

$$K := \hat{K} / A^r \cdot K',$$
return $rct_{\mathbb{S}} \cdot := (ct_{\mathbb{S}} \cdot := (\mathbb{S}', \{c_i\}_{i=0, \ldots, L}), \tilde{K}).$ The re-encryption device 50 re-encrypts the ciphertext $ct_S$ generated by the encryption device 30 and changes the range to be permitted decryption from the attribute information S to the attribute information S' here. However, the re-encryption device 50 can also re-encrypt the re-encrypted ciphertext $rct_{S'}$, and change the range to be permitted decryption.

In this case, in step S51 the ciphertext acquisition unit 514 may acquire, as the ciphertext $ct_S$, the ciphertext $ct_{S'}$ included in the re-encrypted ciphertext $rct_{S'}$. The subsequent processes are the same as in the case where the ciphertext $ct_S$ generated by the encryption device 30 is re-encrypted.

Figure 17:
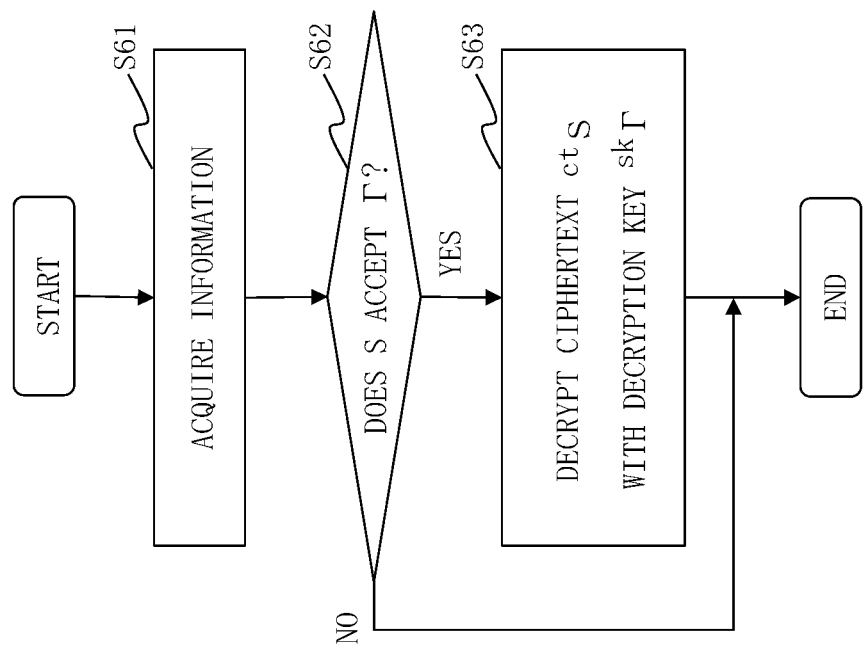
FIG. 17 is a flowchart illustrating operation of the decryption device 60 when a ciphertext $ct_S$ is decrypted according to the first embodiment.
Figure 18:
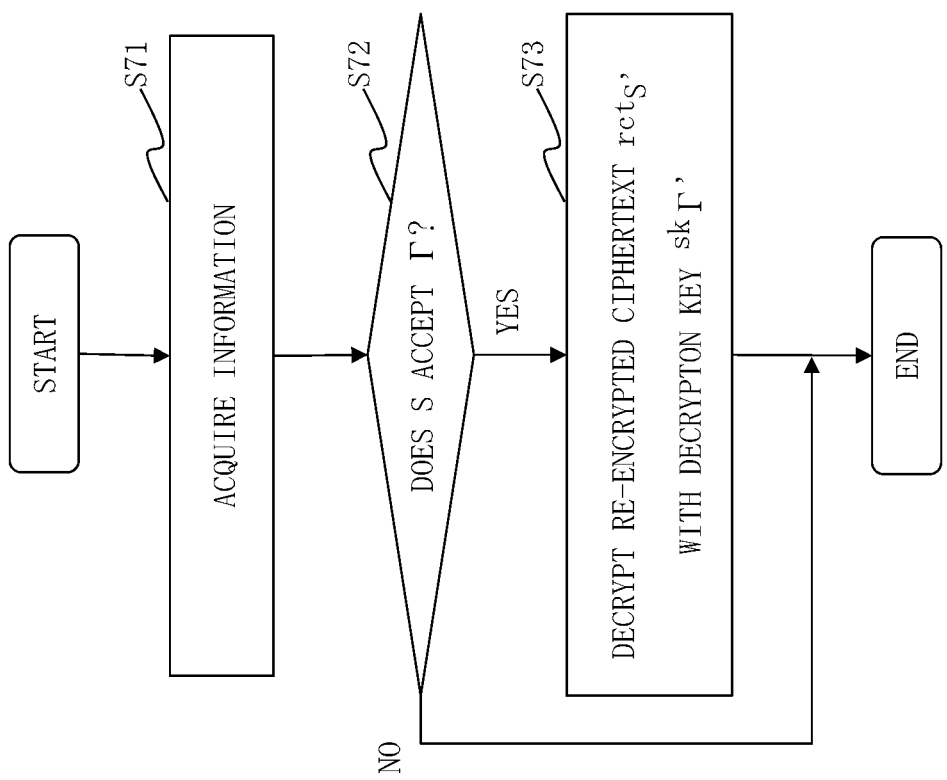
FIG. 18 is a flowchart illustrating operation of the decryption device 60 when a re-encrypted ciphertext $rct_{S'}$ is decrypted according to the first embodiment.

Referring to FIGS. 17 and 18, operation of the decryption device 60 according to the first embodiment will be described.

A procedure for the operation of the decryption device 60 according to the first embodiment is equivalent to a decryption method according to the first embodiment. A program that realizes the operation of the decryption device 60 according to the first embodiment is equivalent to a decryption program according to the first embodiment.

The decryption device 60 executes the Dec algorithm.

Referring to FIG. 17, processes when the ciphertext $ct_S$ is decrypted according to the first embodiment will be described.

(Step S61: Acquisition Process)

The acquisition unit 611 acquires the public key pk, the decryption key $sk_\Gamma$, and the ciphertext $ct_S$.

Specifically, the acquisition unit 611 receives, via the communication interface 64, the public key pk transmitted by the common parameter generation device 10. The acquisition unit 611 receives, via the communication interface 64, the decryption key $sk_\Gamma$ transmitted by the user secret key generation device 20. The acquisition unit 611 acquires, via the communication interface 64, the ciphertext $ct_S$ transmitted by the encryption device 30. The acquisition unit 611 writes the public key pk, the decryption key $sk_\Gamma$, and the ciphertext $ct_S$ in the memory 62.

(Step S62: Determination Process)

The decryption unit 612 determines whether the attribute information S, which is the access structure included in the ciphertext $ct_S$, accepts the attribute information Γ included in the decryption key $sk_\Gamma$.

If it is accepted, the decryption unit 612 advances the process to step S63. If it is not accepted, the decryption unit 612 determines that the ciphertext $ct_S$ cannot be decrypted and terminates the process.

(Step S63: Decryption Process)

The decryption unit 612 decrypts the ciphertext $ct_S$ with the decryption key $sk_{\Gamma t}$ to generate the session key K.

Specifically, the decryption unit 612 calculates an index I and a complementary coefficient $\{\alpha_i\}_{i \in I}$ indicated in Formula 151.

$$\vec{1} = \Sigma_{i \in I} \alpha_i M_i,$$
$$I \subseteq \{i \in \{1, \ldots, L\} | [\rho(i)=(t,\vec{v}_i) \wedge (t,\vec{x}_t) \in \Gamma \wedge \vec{v}_i \cdot \vec{x}_t = 0] \vee [\rho(i)=\neg(t,\vec{v}_i) \wedge (t,\vec{x}_t) \in \Gamma \wedge \vec{v}_i \cdot \vec{x}_t \neq 0]\} \quad \text{[Formula 151]}$$

Note that $M_i$ is the i-th row of the matrix M.

The decryption unit 612 calculates Formula 152 to generate the session key K.

$$K := e(c_0, k_0^*) \prod_{i \in I \wedge \rho(i)=(t,\vec{v}_i)} e(c_i, k_t^*)^{\alpha_i} \prod_{i \in I \wedge \rho(i)=\neg(t,\vec{v}_i)} e(c_i, k_t^*)^{\alpha_i/(\vec{v}_i \cdot \vec{x}_t)} \quad \text{[Formula 152]}$$

That is, the decryption device 60 executes the Dec algorithm indicated in Formula 153.

[Formula 153]
$$\text{Dec}(pk, sk_\Gamma := (\Gamma, k_0^*, \{k_t^*\}_{(t,\vec{x}_t) \in \Gamma}), ct_{\mathbb{S}} := (\mathbb{S}, \{c_i\}_{i=0, \ldots, L})):$$
If $\mathbb{S}$ accepts $\Gamma$ then compute I and $\{\alpha_i\}_{i \in I}$ such that
$$\vec{1} = \Sigma_{i \in I} \alpha_i M_i,$$
$$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee$$
$$[\rho(i) = \neg(t, \vec{v}_i) \wedge (t, \vec{x}_t) \in \Gamma \wedge \vec{v}_i \cdot \vec{x}_t \neq 0]\},$$

$$K := e(c_0, k_0^*) \prod_{i \in I \wedge \rho(i)=(t,\vec{v}_i)} e(c_i, k_t^*)^{\alpha_i} \prod_{i \in I \wedge \rho(i)=\neg(t,\vec{v}_i)} e(c_i, k_t^*)^{\alpha_i / (\vec{v}_i \cdot \vec{x}_t)},$$

return K.

Referring to FIG. 18, processes when the re-encrypted ciphertext rets' is decrypted according to the first embodiment will be described.

(Step S71: Acquisition Process)

The acquisition unit 611 acquires the public key pk, the decryption key $sk_\Gamma$, and the re-encrypted ciphertext $rct_{S'}$. It is assumed here that attribute information that is accepted by the access structure, which is the attribute information S', is attribute information $\Gamma$, and that a decryption key generated using as input the attribute information $\Gamma$ is the decryption key $sk_\Gamma$.

Specifically, the acquisition unit 611 receives, via the communication interface 64, the public key pk transmitted by the common parameter generation device 10. The acquisition unit 611 receives, via the communication interface 64, the decryption key $sk_\Gamma$ transmitted by the user secret key generation device 20. The acquisition unit 611 receives, via the communication interface 64, the re-encrypted ciphertext $rct_{S'}$ generated by the re-encryption device 50. The acquisition unit 611 writes the public key pk, the decryption key $sk_\Gamma$, and the re-encrypted ciphertext $rct_{S'}$, in the memory 62.

Specifically, the decryption unit 612 decrypts the ciphertext $ct_{S'}$ included in the re-encrypted ciphertext $rct_{S'}$ with the decryption key $sk_\Gamma$ to generate the session key K', and generates the session key K from the cipher element $K^\sim$ included in the re-encrypted ciphertext $rct_{S'}$ and the session key K'.

This will be described more specifically.

The re-encrypted ciphertext $rct_{S'}$ is decrypted with the decryption key $sk_\Gamma$ to generate the session key K.

Specifically, the decryption unit 612 calculates an index I and a complementary coefficient $\{\alpha_i\}_{i \in I}$ indicated in Formula 154.

$$\vec{1} = \Sigma_{i \in I} \alpha_i M_i,$$

$$I \subseteq \{i \in \{1, \ldots, L\} | [\rho(i)=(t,\vec{v}_i) \wedge (t,\vec{x}_t) \in \Gamma \wedge \vec{v}_i \cdot \vec{x}_t = 0] \vee [\rho(i)=\neg(t,\vec{v}_i) \wedge (t,\vec{x}_t) \in \Gamma \wedge \vec{v}_i \cdot \vec{x}_t \neq 0]\} \quad \text{[Formula 154]}$$

Note that $M_i$ is the i-th row of the matrix M.

The decryption unit 612 calculates Formula 155 to generate the session key K'.

$$K' := e(c_0, k_0^*) \prod_{i \in I \wedge \rho(i)=(t,\vec{v}_i)} e(c_i, k_t^*)^{\alpha_i} \prod_{i \in I \wedge \rho(i)=\neg(t,\vec{v}_i)} e(c_i, k_t^*)^{\alpha_i / (\vec{v}_i \cdot \vec{x}_t)} \quad \text{[Formula 155]}$$

The decryption unit 612 multiplies the cipher element $K^\sim$ by the session key K' to generate the session key K.

That is, the decryption device 60 executes the Dec algorithm indicated in Formula 156.

[Formula 156]

$$\text{Dec}(pk, sk_\Gamma := (\Gamma, k_0^*, \{k_t^*\}_{(t,\vec{x}_t) \in \Gamma}), rct_{S'} := (ct_{S'} := (S', \{c_i\}_{i=0,\ldots,L}), \tilde{K})):$$
If $S$ accepts $\Gamma$ then compute I and $\{\alpha_i\}_{i \in I}$ such that
$$\vec{1} = \Sigma_{i \in I} \alpha_i M_i,$$
$$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\},$$

$$K' := e(c_0, k_0^*) \prod_{i \in I \wedge \rho(i)=(t,\vec{v}_i)} e(c_i, k_t^*)^{\alpha_i} \prod_{i \in I \wedge \rho(i)=\neg(t,\vec{v}_i)} e(c_i, k_t^*)^{\alpha_i} / (\vec{v}_i \cdot \vec{x}_t),$$

$K := \hat{K} \cdot K'$,
return K.

(Step S72: Determination Process)

The decryption unit 612 determines whether the attribute information S', which is the access structure included in the re-encrypted ciphertext $rct_{S'}$, accepts the attribute information $\Gamma$ included in the decryption key $sk_\Gamma$.

If it is accepted, the decryption unit 612 advances the process to step S73. If it is not accepted, the decryption unit 612 determines that the re-encrypted ciphertext $rct_{S'}$ cannot be decrypted and terminates the process.

(Step S73: Decryption Process)

The decryption unit 612 decrypts the re-encrypted ciphertext $rct_{S'}$ with the decryption key $sk_\Gamma$ to generate the session key K.

*Effects of the First Embodiment*

As described above, the cryptographic system 100 according to the first embodiment generates the re-encrypted ciphertext $rct_{S'}$ that includes as essential elements only the ciphertext $ct_{S'}$ and the cipher element $K^\sim$. Even when the cryptographic system 100 according to the first embodiment re-encrypts the re-encrypted ciphertext $rct_{S'}$, essential elements of the re-encrypted ciphertext $rct_{S'}$ are only the ciphertext $ct_{S'}$ and the cipher element $K^\sim$. That is, even if re-encryption is repeated, essential elements will not increase.

Therefore, it is possible to make the data size of a ciphertext generated by re-encryption not dependent on the number of times re-encryption is performed.

*Other Configurations*

<First Variation>

In the first embodiment, the functional components are realized by software. However, as a first variation, the functional components may be realized by hardware. With regard to this first variation, differences from the first embodiment will be described.

A configuration of the common parameter generation device 10 according to the first variation will be described.

When the functional components are realized by hardware, the common parameter generation device 10 includes an electronic circuit 15 in place of the processor 11, the memory 12, and the storage 13. The electronic circuit 15 is a dedicated circuit that realizes the functions of the functional components, the memory 12, and the storage 13.

A configuration of the user secret key generation device 20 according to the first variation will be described.

When the functional components are realized by hardware, the user secret key generation device 20 includes an electronic circuit 25 in place of the processor 21, the memory 22, and the storage 23. The electronic circuit 25 is a dedicated circuit that realizes the functions of the functional components, the memory 22, and the storage 23.

A configuration of the encryption device 30 according to the first variation will be described.

When the functional components are realized by hardware, the encryption device 30 includes an electronic circuit 35 in place of the processor 31, the memory 32, and the storage 33. The electronic circuit 35 is a dedicated circuit that realizes the functions of the functional components, the memory 32, and the storage 33.

A configuration of the re-encryption key generation device 40 according to the first variation will be described.

When the functional components are realized by hardware, the re-encryption key generation device 40 includes an electronic circuit 45 in place of the processor 41, the memory 42, and the storage 43. The electronic circuit 45 is a dedicated circuit that realizes the functions of the functional components, the memory 42, and the storage 43.

A configuration of the re-encryption device 50 according to the first variation will be described.

When the functional components are realized by hardware, the re-encryption device 50 includes an electronic circuit 55 in place of the processor 51, the memory 52, and the storage 53. The electronic circuit 55 is a dedicated circuit that realizes the functions of the functional components, the memory 52, and the storage 53.

A configuration of the decryption device 60 according to the first variation will be described.

When the functional components are realized by hardware, the decryption device 60 includes an electronic circuit 65 in place of the processor 61, the memory 62, and the storage 63. The electronic circuit 65 is a dedicated circuit that realizes the functions of the functional components, the memory 62, and the storage 63.

Each of the electronic circuits 15, 25, 35, 45, 55, and 65 is assumed to be a single circuit, a composite circuit, a programmed processor, a parallel-programmed processor, a logic IC, a gate array (GA), an application specific integrated circuit (ASIC), or a field-programmable gate array (FPGA).

The respective functional components may be realized by one electronic circuit 15, one electronic circuit 25, one electronic circuit 35, one electronic circuit 45, one electronic circuit 55, and one electronic circuit 65, or the respective functional components may be distributed among and realized by a plurality of electronic circuits 15, a plurality of electronic circuits 25, a plurality of electronic circuits 35, a plurality of electronic circuits 45, a plurality of electronic circuits 55, and a plurality of electronic circuits 65.

<Second Variation>

As a second variation, some of the functional components may be realized by hardware, and the rest of the functional components may be realized by software.

Each of the processors 11, 21, 31, 41, 51, 61, the memories 12, 22, 32, 42, 52, 62, the storages 13, 23, 33, 43, 53, 63, and the electronic circuits 15, 25, 35, 45, 55, 65 is referred to as processing circuitry. That is, the functions of the functional components are realized by the processing circuitry.

REFERENCE SIGNS LIST

100: cryptographic system, 10: common parameter generation device, 11: processor, 12: memory, 13: storage, 14: communication interface, 15: electronic circuit, 111: acquisition unit, 112: parameter generation unit, 113: output unit, 20: user secret key generation device, 21: processor, 22: memory, 23: storage, 24: communication interface, 25: electronic circuit, 211: acquisition unit, 212: user secret key generation unit, 213: output unit, 30: encryption device, 31: processor, 32: memory, 33: storage, 34: communication interface, 35: electronic circuit, 311: acquisition unit, 312: ciphertext generation unit, 313: output unit, 40: re-encryption key generation device, 41: processor, 42: memory, 43: storage, 44: communication interface, 45: electronic circuit, 411: acquisition unit, 412: re-encryption key generation unit, 413: output unit, 50: re-encryption device, 51: processor, 52: memory, 53: storage, 54: communication interface, 55: electronic circuit, 511: acquisition unit, 512: re-encrypted ciphertext generation unit, 513: output unit, 514: ciphertext acquisition unit, 515: key acquisition unit, 60: decryption device, 61: processor, 62: memory, 63: storage, 64: communication interface, 65: electronic circuit, 611: acquisition unit, 612: decryption unit, 613: output unit.

The invention claimed is:

1. A re-encryption device comprising processing circuitry to:

acquire a ciphertext cts out of a session K and the ciphertext cts in which the session key K is encrypted that are generated by an encryption algorithm using as input attribute information S that defines a range to be permitted decryption;

acquire a re-encryption key rk including a converted decryption key $sk_\Gamma^\sim$ that is generated by setting a random number r in a decryption key $sk_\Gamma$ with which the ciphertext cts can be decrypted, a session key K' and a ciphertext cts' in which the session key K' is encrypted that are generated by the encryption algorithm using as input attribute information S' that defines a range to be permitted decryption, and conversion information that is generated from the random number r;

generate a cipher element $K^\sim$ by deleting an element related to the random number r by the conversion information from decryption information $K^\wedge$ and setting the session key K', the decryption information $K^\wedge$ being obtained by decrypting the ciphertext cts with the converted decryption key $sk_\Gamma^\sim$ included in the re-encryption key rk; and output a re-encrypted ciphertext rcts' including the cipher element $K^\sim$ and the ciphertext cts'.

2. The re-encryption device according to claim 1, wherein the ciphertext cts includes a cipher element $c_0$, which is a vector in a basis $B_0$, wherein the decryption key $sk_\Gamma$ includes a key element $k^*_0$, which is a vector in a basis $B^*_0$, wherein the converted decryption key $\widetilde{sk}_\Gamma$ is generated by setting the random number r in a certain basis vector of the basis $B^*_0$, wherein the conversion information is obtained by multiplying an element A by the random number r, the element A being obtained by performing a pairing operation on an element of the basis $B_0$ and an element of the basis $B^*_0$, and wherein the processing circuitry generates the decryption information $\hat{K}$ by performing a pairing operation on a cipher element c of the ciphertext cts and a key element $k^*$ of the converted decryption key $\widetilde{sk}_\Gamma$, and generates the session key K by dividing the decryption information $\hat{K}$ by the conversion information.

3. The re-encryption device according to claim 2, wherein the processing circuitry acquires the ciphertext cts indicated in Formula 8, acquires the re-encryption key rk indicated in Formula 9, and generates the cipher element $\widetilde{K}$ indicated in Formula 10

[Formula 8]
$ct_\mathbb{S} = (\mathbb{S} := (M, \rho), \{c_i\}_{i=0,\ldots,L}) \rightarrow Enc(pk, \mathbb{S} := (M, \rho))$
where
$Enc(pk, \mathbb{S} := (M, \rho))$:

$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$ $\eta_0, \varsigma \xleftarrow{U} \mathbb{F}_q, c_0 := c + (\varsigma, -s_0, 0, 0, \eta_0, 0)_{\mathbb{B}_0},$ for $i = 1, \ldots, L$, if $\rho(i) = (t, \vec{v}_i := (v_{i,1}, \ldots, v_{i,n_t}) \in \mathbb{F}_q^{n_t}\setminus\{\vec{0}\})(v_{i,n_t} \neq 0)$, $\theta_i, \eta_i \xleftarrow{U} \mathbb{F}_q,$ $c_i := (\overline{s_i \vec{e}_{t,1} + \theta_i \vec{v}_i}^{n_t}, \overline{0^{n_t}}^{n_i}, \overline{0^{n_t}}^{n_t}, \overline{\eta_i}^{1})_{\mathbb{B}_t},$ if $\rho(i) = \neg(t, \vec{v}_i)$, $\eta_i \xleftarrow{U} \mathbb{F}_q,$ $c_i := (\overline{s_i \vec{v}_i}^{n_i}, \overline{0^{n_t}}^{n_t}, \overline{0^{n_t}}^{n_i}, \overline{\eta_i}^{1})_{\mathbb{B}_t},$ return $ct_\mathbb{S} := (ct_\mathbb{S}, \{c_i\}_{i=0,\ldots,L}), K$

[Formula 9]
$rk := (\widetilde{sk}_\Gamma, A^r \cdot K', ct_\mathbb{S} \cdot)$
where
$\widetilde{sk}_\Gamma := (\Gamma, k_0^* + rb_{0,6}^*, \{k_t^*\}_{(t,\vec{x}_t)\in\Gamma}),$
$k_0^* := (1,\delta,0,\varphi_0,0,0)_{\mathbb{B}_0^*}$ $k_t^* := (\overline{\delta \vec{x}_t}^{n_i}, \overline{0^{n_t}}^{n_t}, \overline{\vec{\varphi}_t}^{n_i}, \overline{0}^{1})_{\mathbb{B}_t^*}$ for $(t, \vec{x}_t) \in \Gamma,$ $\delta, \varphi_0, r \xleftarrow{U} \mathbb{F}_q, \vec{\varphi}_t \xleftarrow{U} \mathbb{F}_q^{n_t}$ for $(t, \vec{x}_t) \in \Gamma,$ $(ct_\mathbb{S} \cdot), K') \rightarrow Enc(pk, \mathbb{S}')$
[Formula 10]
$\widetilde{K} := \hat{K}/A^r \cdot K',$
where $\hat{K} := e(c_0, k_0^*) \prod_{i \in I \wedge \rho(i)=(t,\vec{v}_i)} e(c_i, k_t^*)\alpha_i \prod_{i \in I \wedge \rho(i)=\neg(t,\vec{v}_i)} e(c_i, k_t^*)\alpha_i / (\vec{v}_i \cdot \vec{x}_t),$ $\vec{1} = \Sigma_{i \in I} \alpha_i M_i,$
$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\},$
$M_i$ is i-th row of M.

4. The re-encryption device according to claim 1, wherein the processing circuitry acquires the ciphertext cts indicated in Formula 1, acquires the re-encryption key rk indicated in Formula 2, and generates the cipher element $\widetilde{K}$ indicated in Formula 3

[Formula 1]
$ct_\mathbb{S} = (\mathbb{S} := (M, \rho), \{c_i\}_{i=0,\ldots,L}) \rightarrow Enc(pk, \mathbb{S} := (M, \rho))$
where
$Enc(pk, \mathbb{S} := (M, \rho))$:

$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$ $\eta_0, \varsigma \xleftarrow{U} \mathbb{F}_q, c_0 := c + (\varsigma, -s_0, 0, 0, \eta_0, 0)_{\mathbb{B}_0},$ for $i = 1, \ldots, L$, if $\rho(i) = (t, \vec{v}_i := (v_{i,1}, \ldots, v_{i,n_t}) \in \mathbb{F}_q^{n_t}\setminus\{\vec{0}\})(v_{i,n_t} \neq 0)$, $\theta_i, \eta_i \xleftarrow{U} \mathbb{F}_q,$ $c_i := (\overline{s_i \vec{e}_{t,1} + \theta_i \vec{v}_i}^{n_t}, \overline{0^{n_t}}^{n_t}, \overline{0^{n_t}}^{n_i}, \overline{\eta_i}^{1})_{\mathbb{B}_t},$ if $\rho(i) = \neg(t, \vec{v}_i)$, $\eta_i \xleftarrow{U} \mathbb{F}_q,$ $c_i := (\overline{s_i \vec{v}_i}^{n_t}, \overline{0^{n_t}}^{n_i}, \overline{0^{n_t}}^{n_t}, \overline{\eta_i}^{1})_{\mathbb{B}_t},$ return $ct_\mathbb{S} := (ct_\mathbb{S}, \{c_i\}_{i=0,\ldots,L}), K$
[Formula 2]
$rk := (\widetilde{sk}_\Gamma, A^r \cdot K', ct_\mathbb{S} \cdot)$
where
$\widetilde{sk}_\Gamma := (\Gamma, k_0^* + rb_{0,6}^*, \{k_t^*\}_{(t,\vec{x}_t)\in\Gamma}),$
$k_0^* := (1,\delta,0,\varphi_0,0,0)_{\mathbb{B}_0^*}$ $k_t^* := (\overline{\delta \vec{x}_t}^{n_t}, \overline{0^{n_t}}^{n_t}, \overline{\vec{\varphi}_t}^{n_i}, \overline{0}^{1})_{\mathbb{B}_t^*}$ for $(t, \vec{x}_t) \in \Gamma,$ $\delta, \varphi_0, r \xleftarrow{U} \mathbb{F}_q, \vec{\varphi}_t \xleftarrow{U} \mathbb{F}_q^{n_t}$ for $(t, \vec{x}_t) \in \Gamma,$ $(ct_\mathbb{S} \cdot), K') \rightarrow Enc(pk, ct_\mathbb{S}')$
[Formula 3]
$\widetilde{K} := \hat{K}/A^r \cdot K',$
where $\hat{K} := e(c_0, k_0^*) \prod_{i \in I \wedge \rho(i)=(t,\vec{v}_i)} e(c_i, k_t^*)\alpha_i \prod_{i \in I \wedge \rho(i)=\neg(t,\vec{v}_i)} e(c_i, k_t^*)\alpha_i / (\vec{v}_i \cdot \vec{x}_t),$ $\vec{1} = \Sigma_{i \in I} \alpha_i M_i,$
$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\},$
$M_i$ is i-th row of M.

5. A cryptographic system comprising:

an encryption device to generate a ciphertext cts out of a session key K and the ciphertext cts in which the session key K is encrypted that are generated by an encryption algorithm using as input attribute information S that defines a range to be permitted decryption;

a re-encryption key generation device to generate a re-encryption key rk including a converted decryption key $sk_\Gamma^\sim$ that is generated by setting a random number r in a decryption key $sk_\Gamma$ with which the ciphertext cts can be decrypted, a session key K' and a ciphertext cts' in which the session key K' is encrypted that are generated by the encryption algorithm using as input attribute information S' that defines a range to be permitted decryption, and conversion information that is generated from the random number r; and a re-encryption device to generate a cipher element $\tilde{K}$ by deleting an element related to the random number r by the conversion information from decryption information $\hat{K}$ and setting the session key K', the decryption information $\hat{K}$ being obtained by decrypting the ciphertext cts with the converted decryption key $sk_\Gamma^\sim$ included in the re-encryption key rk, and output a re-encrypted ciphertext rcts' including the cipher element $\tilde{K}$ and the ciphertext cts'.

6. The cryptographic system according to claim 5, wherein the ciphertext cts includes a cipher element $c_0$, which is a vector in a basis $B_0$, wherein the decryption key $sk_\Gamma$ includes a key element $k^*_0$, which is a vector in a basis $B^*_0$, wherein the converted decryption key $sk_\Gamma^\sim$ is generated by setting the random number r in a certain basis vector of the basis $B^*_0$, wherein the conversion information is obtained by multiplying an element A by the random number r, the element A being obtained by performing a pairing operation on an element of the basis $B_0$ and an element of the basis $B^*_0$, and wherein the re-encryption device generates the decryption information $\hat{K}$ by performing a pairing operation on a cipher element c of the ciphertext cts and a key element $k^*$ of the converted decryption key $sk_\Gamma^\sim$, and generates the session key K by dividing the decryption information $\hat{K}$ by the conversion information.

7. The cryptographic system according to claim 6, wherein the encryption device generates the ciphertext cts indicated in Formula 11, wherein the re-encryption key generation device generates the re-encryption key rk indicated in Formula 12, and wherein the re-encryption device generates the cipher element $\tilde{K}$ indicated in Formula 13

[Formula 11]
$ct_\mathbb{S} = (\mathbb{S} := (M, \rho), \{c_i\}_{i=0,\ldots,L}) \rightarrow Enc(pk, \mathbb{S} := (M, \rho))$
where
$Enc(pk, \mathbb{S} := (M, \rho))$:

$$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$$

$$\eta_0, \varsigma \xleftarrow{U} \mathbb{F}_q, c_0 := c + (\varsigma, -s_0, 0, 0, \eta_0, 0)_{\mathbb{B}_0},$$

for $i = 1, \ldots, L$, if $\rho(i) = (t, \vec{v}_i := (v_{i,1}, \ldots, v_{i,n_t}) \in \mathbb{F}_q^{n_t} \setminus \{\vec{0}\})(v_{i,n_t} \neq 0)$, $$\theta_i, \eta_i \xleftarrow{U} \mathbb{F}_q,$$

$$c_i := (\overbrace{s_i \vec{e}_{t,1} + \theta_i \vec{v}_i}^{n_t}, \overbrace{0^{n_i}}^{n_t}, \overbrace{0^{n_t}}^{n_t}, \overbrace{\eta_i}^{1})_{\mathbb{B}_t},$$

if $\rho(i) = \neg(t, \vec{v}_i)$, $$\eta_i \xleftarrow{U} \mathbb{F}_q,$$

$$c_i := (\overbrace{s_i \vec{v}_i}^{n_t}, \overbrace{0^{n_i}}^{n_t}, \overbrace{0^{n_t}}^{n_t}, \overbrace{\eta_i}^{1})_{\mathbb{B}_t},$$

return $ct_\mathbb{S} := (ct_\mathbb{S}, \{c_i\}_{i=0,\ldots,L}), K$

[Formula 12]
$rk := (\tilde{sk}_\Gamma, A^r \cdot K', ct_\mathbb{S}')$
where
$\tilde{sk}_\Gamma := (\Gamma, k_0^* + rb_{0,6}^*, \{k_t^*\}_{(t,\vec{x}_t) \in \Gamma}),$
$k_0^* := (1, \delta, 0, \varphi_0, 0, 0)_{\mathbb{B}_0^*}$ $$k_t^* := (\overbrace{\delta \vec{x}_t}^{n_t}, \overbrace{0^{n_t}}^{n_t}, \overbrace{\vec{\varphi}_t}^{n_t}, \overbrace{0}^{1})_{\mathbb{B}_t^*} \text{ for } (t, \vec{x}_t) \in \Gamma,$$

$\delta, \varphi_0, r \xleftarrow{U} \mathbb{F}_q, \vec{\varphi}_t \xleftarrow{U} \mathbb{F}_q^{n_t} \text{ for } (t, \vec{x}_t) \in \Gamma,$ $(ct_\mathbb{S}'), K') \rightarrow Enc(pk, \mathbb{S}')$
[Formula 13]
$\tilde{K} := \hat{K}/A^r \cdot K',$
where $$\hat{K} := e(c_0, k_0^*) \prod_{i \in I \wedge \rho(i)=(t,\vec{v}_i)} e(c_i, k_t^*)\alpha_i \prod_{i \in I \wedge \rho(i)=\neg(t,\vec{v}_i)} e(c_i, k_t^*)\alpha_i / (\vec{v}_i \cdot \vec{x}_t),$$

$\vec{1} = \Sigma_{i \in I} \alpha_i M_i,$
$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee$
$[\rho(i) = \neg(t, \vec{v}_i) \wedge (t, \vec{x}_t) \in \Gamma \wedge \vec{v}_i \cdot \vec{x}_t \neq 0]\},$
$M_i$ is i-th row of M.

8. The cryptographic system according to claim 7, further comprising a decryption device to decrypt the ciphertext cts' included in the re-encrypted ciphertext rcts' with a decryption key $sk_{\Gamma'}$ so as to generate the session key K', and generate the session key K from a cipher element $\tilde{K}$ included in the re-encrypted ciphertext rcts' and the session key K'.

9. The cryptographic system according to claim 8, wherein the decryption device generates the session key K indicated in Formula 14

$K := \tilde{K} \cdot K'$ [Formula 14].

10. The cryptographic system according to claim 5, wherein the encryption device generates the ciphertext cts indicated in Formula 4, wherein the re-encryption key generation device generates the re-encryption key rk indicated in Formula 5, and wherein the re-encryption device generates the cipher element $\tilde{K}$ indicated in Formula 6

[Formula 4]
$ct_\mathbb{S} = (\mathbb{S} := (M, \rho), \{c_i\}_{i=0,\ldots,L}) \rightarrow Enc(pk, \mathbb{S} := (M, \rho))$
where
$Enc(pk, \mathbb{S} := (M, \rho))$:

$$\vec{f} \xleftarrow{U} \mathbb{F}_q^r, \vec{s}^T := (s_1, \ldots, s_L)^T := M \cdot \vec{f}^T, s_0 := \vec{1} \cdot \vec{f}^T,$$

$$\eta_0, \varsigma \xleftarrow{U} \mathbb{F}_q, c_0 := c + (\varsigma, -s_0, 0, 0, \eta_0, 0)_{\mathbb{B}_0},$$

for $i = 1, \ldots, L$, if $\rho(i) = (t, \vec{v}_i := (v_{i,1}, \ldots, v_{i,n_t}) \in \mathbb{F}_q^{n_t} \setminus \{\vec{0}\})(v_{i,n_t} \neq 0)$, $$\theta_i, \eta_i \xleftarrow{U} \mathbb{F}_q,$$

-continued $$c_i := (\overline{s_i \vec{e}_{t,1} + \theta_i \vec{v}_i}^{n_t}, \overline{0^{n_t}}^{n_i}, \overline{0^{n_t}}^{n_i}, \overline{\eta_i}^{1})_{\mathbb{B}_t},$$

if $\rho(i) = \neg(t, \vec{v}_i)$, $$\eta_i \xleftarrow{U} \mathbb{F}_q,$$

$$c_i := (\overline{s_i \vec{v}_i}^{n_t}, \overline{0^{n_t}}^{n_i}, \overline{0^{n_t}}^{n_i}, \overline{\eta_i}^{1})_{\mathbb{B}_t},$$

return $cts_{\mathbb{S}} := (cts_{\mathbb{S}}, \{c_i\}_{i=0,\ldots,L})$, K

[Formula 5]
$rk := (\tilde{sk}_\Gamma, A^r \cdot K', cts_{\mathbb{S}} \cdot)$
where $\tilde{sk}_\Gamma := (\Gamma, k_0^* + rb_{0,6}^*, \{k_t^*\}_{(t, \vec{x}_t) \in \Gamma}),$
$k^*_0 := (1, \delta, 0, \varphi_0, 0, 0)_{\mathbb{B}_0^*},$ $$k_t^* := (\overline{\delta \vec{x}_t}^{n_t}, \overline{0^{n_t}}^{n_t}, \overline{\vec{\varphi}_t}^{n_t}, \overline{0}^{1})_{\mathbb{B}_t^*} \text{ for } (t, \vec{x}_t) \in \Gamma,$$

$\delta, \varphi_0, r \xleftarrow{U} \mathbb{F}_q, \vec{\varphi}_t \xleftarrow{U} \mathbb{F}_q^{n_t}$ for $(t, \vec{x}_t) \in \Gamma,$ $(cts_{\mathbb{S}} \cdot), K') \to Enc(pk, \mathbb{S}')$
[Formula 6]
$\tilde{K} := \hat{K}/A^r \cdot K',$
where $$\hat{K} := e(c_0, k_0^*) \prod_{i \in I \wedge \rho(i) = (t, \vec{v}_i)} e(c_i, k_t^*) \alpha_i \prod_{i \in I \wedge \rho(i) = \neg(t, \vec{v}_i)} e(c_i, k_t^*) \alpha_i / (\vec{v}_i \cdot \vec{x}_t),$$

$\vec{1} = \Sigma_{i \in I} \alpha_i M_i,$
$I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\},$
$M_i$ is i-th row of M.

11. The cryptographic system according to claim 10, further comprising
a decryption device to decrypt the ciphertext cts' included in the re-encrypted ciphertext rcts' with a decryption key $sk_\Gamma$, so as to generate the session key K', and generate the session key K from a cipher element K˜ included in the re-encrypted ciphertext rcts' and the session key K'.

12. The cryptographic system according to claim 11, wherein the decryption device generates the session key K indicated in Formula 7

$K := \tilde{K} \cdot K'$ [Formula 7].

13. A re-encryption method comprising:
acquiring a ciphertext cts out of a session K and the ciphertext cts in which the session key K is encrypted that are generated by an encryption algorithm using as input attribute information S that defines a range to be permitted decryption;
acquiring a re-encryption key rk including a converted decryption key $sk_\Gamma^\sim$ that is generated by setting a random number r in a decryption key $sk_\Gamma$ with which the ciphertext cts can be decrypted, a session key K' and a ciphertext cts' in which the session key K' is encrypted that are generated by the encryption algorithm using as input attribute information S' that defines a range to be permitted decryption, and conversion information that is generated from the random number r;
generating a cipher element K˜ by deleting an element related to the random number r by the conversion information from decryption information Kˆ and setting the session key K', the decryption information Kˆ being obtained by decrypting the ciphertext cts with the converted decryption key $sk_\Gamma^\sim$ included in the re-encryption key rk; and
outputting a re-encrypted ciphertext rcts' including the cipher element K˜ and the ciphertext cts '.

14. A non-transitory computer readable medium storing a re-encryption program that causes a computer to function as a re-encryption device to perform:
a ciphertext acquisition process of acquiring a ciphertext cts out of a session K and the ciphertext cts in which the session key K is encrypted that are generated by an encryption algorithm using as input attribute information S that defines a range to be permitted decryption;
a key acquisition process of acquiring a re-encryption key rk including a converted decryption key $sk_\Gamma^\sim$ that is generated by setting a random number r in a decryption key $sk_\Gamma$, with which the ciphertext cts can be decrypted, a session key K' and a ciphertext cts' in which the session key K' is encrypted that are generated by the encryption algorithm using as input attribute information S' that defines a range to be permitted decryption, and conversion information that is generated from the random number r;
a re-encrypted ciphertext generation process of generating a cipher element K˜ by deleting an element related to the random number r by the conversion information from decryption information Kˆ and setting the session key K', the decryption information Kˆ being obtained by decrypting the ciphertext cts with the converted decryption key $sk_\Gamma^\sim$ included in the re-encryption key rk; and
an output process of outputting a re-encrypted ciphertext rcts' including the cipher element K˜ and the ciphertext cts'.

* * * * *